US011061961B2

(12) United States Patent
Mukhopadhyay et al.

(10) Patent No.: US 11,061,961 B2
(45) Date of Patent: Jul. 13, 2021

(54) ARTIFICIAL INTELLIGENCE BASED MUSIC PLAYLIST CURATION

(71) Applicant: ACCENTURE GLOBAL SOLUTIONS LIMITED, Dublin (IE)

(72) Inventors: Abhisek Mukhopadhyay, Shyamnagar (IN); Shubhashis Sengupta, Bangalore (IN); Andrew Fano, Lincolnshire, IL (US); Sneha Singhania, Erode (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 83 days.

(21) Appl. No.: 16/412,239

(22) Filed: May 14, 2019

(65) Prior Publication Data
US 2020/0364261 A1    Nov. 19, 2020

(51) Int. Cl.
*G06F 16/638*    (2019.01)
*G06K 9/62*    (2006.01)
*G06F 16/65*    (2019.01)
*G06F 16/683*    (2019.01)

(52) U.S. Cl.
CPC ............ *G06F 16/639* (2019.01); *G06F 16/65* (2019.01); *G06F 16/683* (2019.01); *G06K 9/6276* (2013.01)

(58) Field of Classification Search
CPC ...... G06F 16/639; G06F 16/635; G06F 16/65; G06F 16/683; G06F 16/433; G06F 16/24578; G06K 9/6276; H04L 67/306; H04L 67/22
See application file for complete search history.

(56) References Cited

U.S. PATENT DOCUMENTS

| | | | |
|---|---|---|---|
| 9,576,050 B1* | 2/2017 | Walters | G06F 16/632 |
| 2003/0221541 A1* | 12/2003 | Platt | G10H 1/0058 84/609 |
| 2005/0038819 A1* | 2/2005 | Hicken | G06F 16/683 |
| 2005/0187976 A1* | 8/2005 | Goodman | G11B 27/11 |
| 2011/0087665 A1* | 4/2011 | Weare | G06F 16/68 707/737 |
| 2012/0290621 A1* | 11/2012 | Heitz, III | G06F 16/639 707/780 |

(Continued)

OTHER PUBLICATIONS

Kirell Benzi et al., "Song Recommendation With Non-Negative Matrix Factorization and Graph Total Variation," 2016, ICASSP 2016 , pp. 2439-2443. (Year: 2016).*

(Continued)

*Primary Examiner* — Dino Kujundzic
(74) *Attorney, Agent, or Firm* — Mannava & Kang, P.C.

(57) ABSTRACT

In some examples, artificial intelligence based music playlist curation may include ascertaining listening data for a plurality of tracks, and generating a plurality of embeddings that represent the plurality of tracks. A replacement track for an existing track in an input playlist may be generated. Alternatively or additionally, at least one additional track may be added to the input playlist. Alternatively or additionally, based on a seed set of tracks, an output playlist that includes a specified number of tracks that is greater than a number of tracks in the seed set of tracks may be generated. Alternatively or additionally, based on a plurality of specified attributes, the plurality of embeddings may be partitioned into a plurality of clusters corresponding to the plurality of specified attributes.

20 Claims, 27 Drawing Sheets

(56) References Cited

U.S. PATENT DOCUMENTS

| | | | |
|---|---|---|---|
| 2013/0167029 A1* | 6/2013 | Friesen | G06F 16/639 715/716 |
| 2014/0074269 A1* | 3/2014 | Weston | G06Q 30/0282 700/94 |
| 2014/0195026 A1* | 7/2014 | Wieder | G06F 21/10 700/94 |
| 2014/0229828 A1* | 8/2014 | Bilinski | G06F 16/639 715/716 |
| 2014/0229894 A1* | 8/2014 | Vinna | G06F 16/639 715/810 |
| 2014/0280181 A1* | 9/2014 | Rodger | G06F 16/2365 707/740 |
| 2015/0039644 A1* | 2/2015 | Trivedi | G06F 16/639 707/767 |
| 2015/0143394 A1* | 5/2015 | Hijikata | H04N 21/44222 725/14 |
| 2016/0092559 A1* | 3/2016 | Lind | H04L 65/4084 715/716 |
| 2018/0081968 A1* | 3/2018 | Aryan | G06N 7/005 |
| 2018/0189306 A1* | 7/2018 | Lamere | G06F 16/4387 |
| 2018/0246694 A1* | 8/2018 | Gibson | H04L 67/22 |
| 2018/0268054 A1* | 9/2018 | Mustain | G06F 16/635 |
| 2019/0018644 A1* | 1/2019 | Kovacevic | G06Q 50/01 |

OTHER PUBLICATIONS

Budhraja et al., "Probability Based Playlist Generation Based on Music Similarity and User Customization," 2012, 2012 National Conference on Computing and Communication Systems, pp. 1-5. (Year: 2012).*

Chedrawy et al., "A Web Recommender System for Recommending, Predicting and Personalizing Music Playlists," 2009, WISE 2009, pp. 335-342. (Year: 2009).*

Xiao et al., "Learning a Music Similarity Measure on Automatic Annotations with Application to Playlist Generation," 2009, ICASSP 2009, pp. 1885-1888. (Year: 2009).*

* cited by examiner

| track_id | timestamp_utc | user_id | prev_ts | ts_diff | sess_change indicator | session_id |
|---|---|---|---|---|---|---|
| abc123456 | 12/1/2037 3:45 | usr121212 | None | 1801 | 1 | usr121212_2037-12-1_1 |
| abc345679 | 12/1/2037 3:45 | usr121212 | 12/1/2037 3:45 | 0 | 0 | usr121212_2037-12-1_1 |
| abc567890 | 12/1/2037 4:00 | usr121212 | 12/1/2037 3:45 | 900 | 0 | usr121212_2037-12-1_1 |
| abc789012 | No change 12/1/2037 4:15 | usr121212 | 12/1/2037 4:00 | 0 | 0 | usr121212_2037-12-1_1 |
| abc901234 | Session change | usr121212 | 12/1/2037 4:00 | 900 | 0 | usr121212_2037-12-1_1 |
| mno234567 | 12/1/2037 19:15 | usr121212 | 12/1/2037 4:15 | 54000 | 1 | usr121212_2037-12-1_2 |
| mno456789 | 12/1/2037 19:30 | usr121212 | 12/1/2037 19:15 | 900 | 0 | usr121212_2037-12-1_2 |
| mno678901 | 12/1/2037 19:30 | usr121212 | 12/1/2037 19:30 | 0 | 0 | usr121212_2037-12-1_2 |
| mno890123 | 12/1/2037 20:00 | usr121212 | 12/1/2037 19:30 | 1800 | 0 | usr121212_2037-12-1_2 |

ASCERTAIN, BY AT LEAST ONE HARDWARE PROCESSOR, LISTENING DATA FOR A PLURALITY OF TRACKS
2202

GENERATE, BY THE AT LEAST ONE HARDWARE PROCESSOR AND BASED ON AN ANALYSIS OF THE LISTENING DATA, A PLURALITY OF EMBEDDINGS THAT REPRESENT THE PLURALITY OF TRACKS
2204

GENERATE, BY THE AT LEAST ONE HARDWARE PROCESSOR AND BASED ON THE PLURALITY OF EMBEDDINGS, A REPLACEMENT TRACK FOR AN EXISTING TRACK IN AN INPUT PLAYLIST BY OBTAINING A TRACK IDENTIFICATION FOR THE EXISTING TRACK THAT IS TO BE REPLACED
2206

IDENTIFY, FROM THE PLURALITY OF EMBEDDINGS AND BASED ON THE TRACK IDENTIFICATION, AN EMBEDDING ASSOCIATED WITH THE EXISTING TRACK
2208

IDENTIFY, FROM THE PLURALITY OF EMBEDDINGS, K-NEAREST NEIGHBOR EMBEDDINGS RELATIVE TO THE IDENTIFIED EMBEDDING ASSOCIATED WITH THE EXISTING TRACK
2210

ARTIFICIAL INTELLIGENCE BASED MUSIC PLAYLIST CURATION

BACKGROUND

A music streaming service may utilize or otherwise generate playlists that include a logical collection of songs to engage different types of audiences. In this regard, once a playlist is published, performance of the playlist may be tracked. For example, performance of the playlist may be tracked to determine which song is being played the most, which song is being played the least, etc.

BRIEF DESCRIPTION OF DRAWINGS

Features of the present disclosure are illustrated by way of example and not limited in the following figure(s), in which like numerals indicate like elements, in which:

FIG. 20 illustrates session generation to illustrate operation of the artificial intelligence based music playlist curation apparatus of FIG. 1 in accordance with an example of the present disclosure;

DETAILED DESCRIPTION

Figure 1:
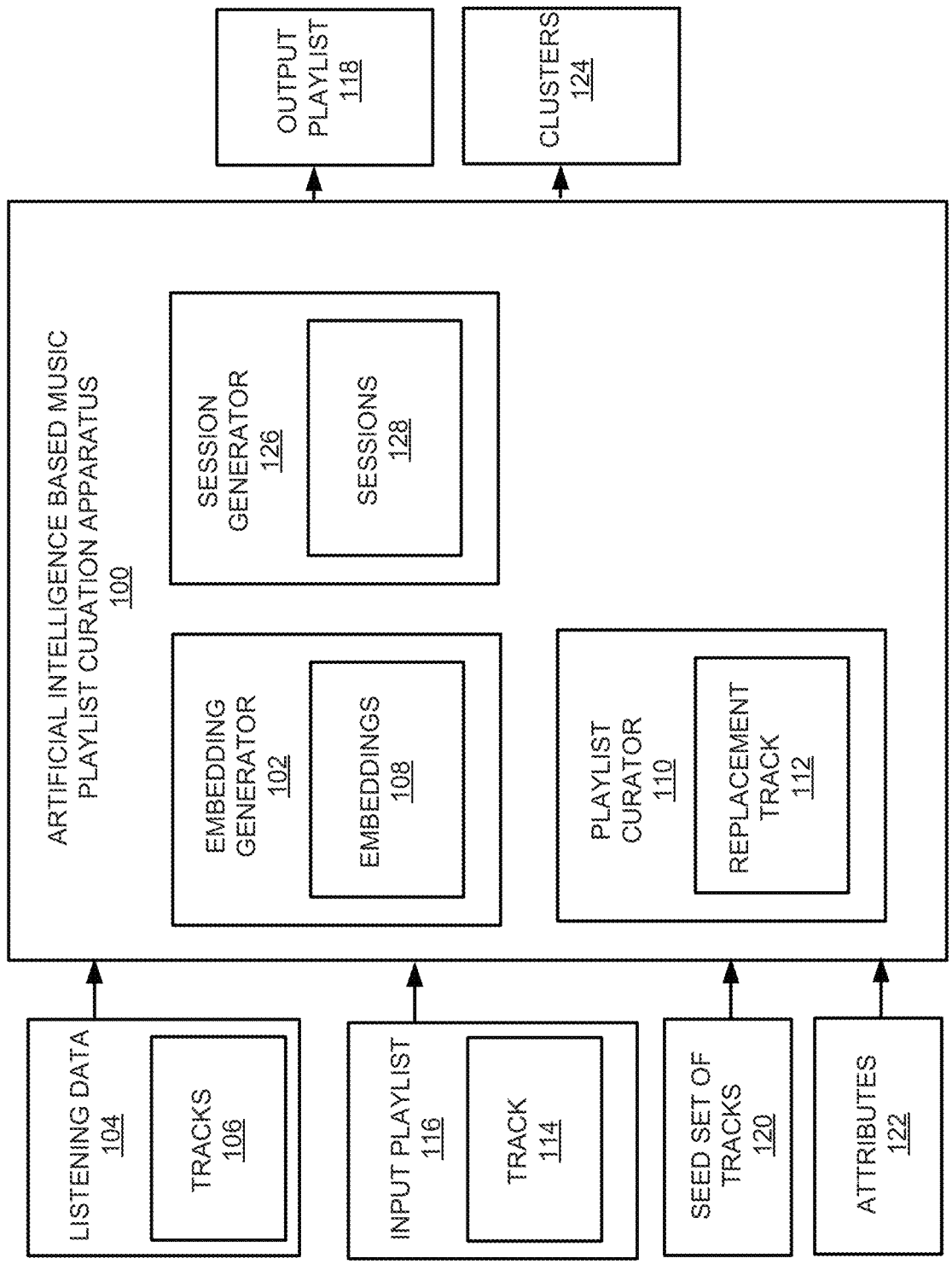
FIG. 1 illustrates a layout of an artificial intelligence based music playlist curation apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Artificial intelligence based music playlist curation apparatuses, methods for artificial intelligence based music playlist curation, and non-transitory computer readable media having stored thereon machine readable instructions to provide artificial intelligence based music playlist curation are disclosed herein. The apparatuses, methods, and non-transitory computer readable media disclosed herein provide for artificial intelligence based music playlist curation by analyzing usage logs, for example, from a music service, to generate theme based playlists. In this regard, the theme based playlists may include newly generated playlists and/or augmented existing playlists.

As disclosed herein, performance of a playlist may be tracked to determine which song (e.g., track) is being played the most, which track is being played the least, etc. In this regard, it is technically challenging to generate theme based playlists that may include newly generated playlists and/or augmented existing playlists to increase user retention.

In order to address at least the aforementioned technical challenges, the apparatuses, methods, and non-transitory computer readable media disclosed herein may utilize user listening data to generate a plurality of embeddings that represent a plurality of tracks. A replacement track for an existing track in an input playlist may be generated to generate a theme based playlist. Alternatively or additionally, at least one additional track may be added to the input playlist to generate a theme based playlist. Alternatively or additionally, based on a seed set of tracks, an output theme based playlist that includes a specified number of tracks that is greater than a number of tracks in the seed set of tracks may be generated. Alternatively or additionally, based on a plurality of specified attributes, the plurality of embeddings may be partitioned into a plurality of clusters corresponding to the plurality of specified attributes to generate theme based playlists corresponding to the plurality of clusters. The theme based playlist may provide benefits such as improved accuracy with respect to determination of tracks of a playlist. For example, the embeddings may be used to generate, based on a seed set of tracks, the theme based playlist as disclosed herein, where the theme based playlist may include improved accuracy with respect to inclusion of tracks within the playlist. Yet further, the theme based playlist may provide benefits such as reduced memory utilization. For example, portions of a theme based playlist may be buffered such that a portion (e.g.,x number of tracks, where x is less than a total number of tracks) that is being played is in memory, and the remaining tracks are buffered at another location. This is because absent the utilization of a theme based playlist, a user may be more prone to moving from one track to another, whereas with a theme based playlist, the user may likely continue with the portion of the theme based playlist that is being currently played.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example artificial intelligence based music playlist curation apparatus (hereinafter also referred to as "apparatus 100").

Referring to FIG. 1, the apparatus 100 may include an embedding generator 102 that is executed by at least one hardware processor (e.g., the hardware processor 2102 of FIG. 21, and/or the hardware processor 2304 of FIG. 23) to ascertain listening data 104 for a plurality of tracks 106. The embedding generator 102 may generate, based on an analysis of the listening data 104, a plurality of embeddings 108 that represent the plurality of tracks 106. For example, the embeddings 108 may include hundreds of thousands, or millions of embeddings corresponding to unique tracks.

A playlist curator 110 that is executed by at least one hardware processor (e.g., the hardware processor 2102 of FIG. 21, and/or the hardware processor 2304 of FIG. 23) may generate, based on the plurality of embeddings 108, a replacement track 112 for an existing track 114 in an input playlist 116.

According to examples disclosed herein, the input playlist 116 that includes the replaced track may be output as an output playlist 118.

According to examples disclosed herein, the playlist curator 110 may generate, based on the plurality of embeddings 108, the replacement track 112 for the existing track 114 in the input playlist 116 by obtaining a track identification for the existing track 114 that is to be replaced. The playlist curator 110 may identify, from the plurality of embeddings 108 and based on the track identification, an embedding associated with the existing track 114. The playlist curator 110 may identify, from the plurality of embeddings 108, K-nearest neighbor embeddings relative to the identified embedding associated with the existing track. The playlist curator 110 may rank the identified K-nearest neighbor embeddings. The playlist curator 110 may identify, from the ranked K-nearest neighbor embeddings, a highest ranked K-nearest neighbor embedding that is not included in the input playlist 116. For example, the highest ranked K-nearest neighbor embedding may include a lowest score with respect to a K-nearest neighbor determination. Further, the playlist curator 110 may designate the highest ranked K-nearest neighbor embedding as the replacement track for the existing track 114 in the input playlist 116.

Alternatively or additionally, the playlist curator 110 may add, based on the plurality of embeddings 108, at least one additional track to the input playlist 116.

According to examples disclosed herein, the playlist curator 110 may add, based on the plurality of embeddings 108, the at least one additional track to the input playlist 116 by identifying, from the plurality of embeddings 108, embeddings associated with tracks included in the input playlist 116. Further, the playlist curator 110 may identify, based on cosine similarity between the embeddings associated with the tracks included in the input playlist 116 and the plurality of embeddings 108, the at least one additional track.

According to examples disclosed herein, the playlist curator 110 may add, based on the plurality of embeddings 108, the at least one additional track to the input playlist 116 by identifying, from the plurality of embeddings 108, embeddings associated with tracks included in the input playlist 116. The playlist curator 110 may identify, based on cosine similarity between the embeddings associated with the tracks included in the input playlist 116 and the plurality of embeddings 108, at least two additional tracks. For example, the at least two additional tracks may be selected based on a highest cosine similarity (e.g., two additional tracks with the highest cosine similarity, or three additional tracks with the highest cosine similarity, etc.) between the embeddings associated with the tracks included in the input playlist 116 and the plurality of embeddings 108. The playlist curator 110 may determine, for each track of the at least two additional tracks, a support factor that specifies a number of times a track of the at least two additional tracks is similar to a track of the input playlist 116. Further, the playlist curator 110 may designate the track of the at least two additional tracks that includes a specified minimum support factor as the at least one additional track that is to be added to the input playlist 116.

Alternatively or additionally, the playlist curator 110 may generate, based on the plurality of embeddings 108 and based on a seed set of tracks 120, the output playlist 118 that includes a specified number of tracks that is greater than a number of tracks in the seed set of tracks 120.

According to examples disclosed herein, the playlist curator 110 may generate, based on the plurality of embeddings 108 and based on the seed set of tracks 120, the output playlist 118 that includes the specified number of tracks that is greater than the number of tracks in the seed set of tracks 120 by identifying, from the plurality of embeddings 108 and based on the seed set of tracks 120, embeddings associated with the seed set of tracks 120. The seed set of tracks 120 may be designated an original seed set of tracks. The playlist curator 110 may identify, based on cosine similarity between the embeddings associated with the seed set of tracks 120 and the plurality of embeddings 108, a new seed set of tracks. A number of tracks included in the new seed set of tracks may be greater than a number of tracks included in the original seed set of tracks. The playlist curator 110 may generate, based on the new seed set of tracks, the output playlist 118.

According to examples disclosed herein, the playlist curator 110 may generate, based on the new seed set of tracks, the output playlist 118 by generating a further seed set of tracks by removing at least one track from the new seed set of tracks. The playlist curator 110 may identify, based on cosine similarity between the embeddings associated with the further seed set of tracks and the plurality of embeddings 108, a final seed set of tracks. A number of tracks included in the final seed set of tracks may be greater than a number of tracks included in the original seed set of tracks. Further, the playlist curator 110 may generate, based on the final seed set of tracks, the output playlist 118.

Alternatively or additionally, the playlist curator 110 may partition, based on a plurality of specified attributes 122, the plurality of embeddings 108 into a plurality of clusters 124 corresponding to the plurality of specified attributes 122.

According to examples disclosed herein, the playlist curator 110 may partition, based on the plurality of specified attributes 122, the plurality of embeddings 108 into the plurality of clusters 124 corresponding to the plurality of specified attributes 122 by identifying, based on K-means clustering and from the plurality of embeddings 108, the plurality of clusters 124 corresponding to the plurality of specified attributes 122.

Examples of the plurality of specified attributes 122 may include a geographic region, a type of person, or any type of attribute that may be used to partition the embeddings.

A session generator 126 that is executed by at least one hardware processor (e.g., the hardware processor 2102 of FIG. 21, and/or the hardware processor 2304 of FIG. 23) may generate, based on the analysis of the listening data 104, a plurality of sessions 128. The session generator 126 may determine, for each track played in the listening data 104, a user identification, a track identification, and a timestamp associated with playing of a track. The session generator 126 may generate groups from the listening data 104 according to the user identification and the timestamp. The session generator 126 may filter the generated groups to determine groups that include a minimum count of unique tracks played. The session generator 126 may generate initial sessions by assigning session identifications to tracks of the determined groups that are played within a specified time difference threshold. Further, the session generator 126 may determine, from the generated initial sessions, the plurality of sessions 128 that include greater than or equal to a minimum number of tracks played.

Operation of the apparatus 100 is described in further detail with reference to FIGS. 1-20.

Figure 2A:
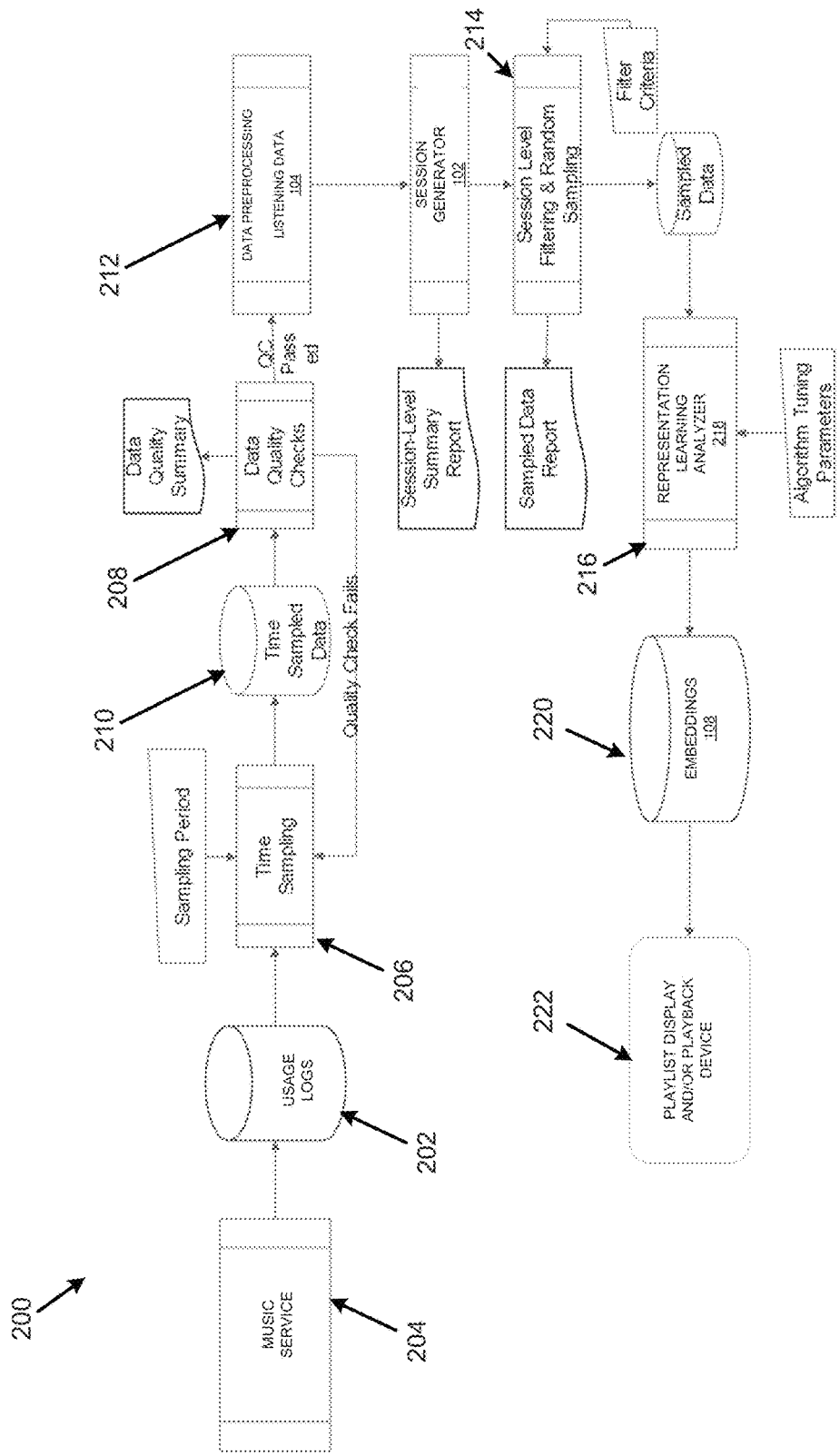
FIG. 2A illustrates an architecture of the artificial intelligence based music playlist curation apparatus of FIG. 1 in accordance with an example of the present disclosure.

FIG. 2A illustrates an architecture 200 of the apparatus 100 in accordance with an example of the present disclosure.

Referring to FIG. 2A, as disclosed herein, the session generator 126 may generate, based on the analysis of listening data 104, the plurality of sessions 128. In this regard, the listening data 104 may be determined by first ascertaining usage logs at 202 from a music service provider at 204. For example, user listening activities may be stored in the form of usage logs at 202.

At 206, with respect to time sampling, usage logs may be selected for a particular time (e.g., 6 months, etc.), based, for example, on a sampling period parameter.

At 208, with respect to data quality checks, a type and presence of data fields, timeliness, validity, accuracy, and consistency may be checked with respect to the time sampled data at 210.

At 212, with respect to data preprocessing, the quality controlled passed data from block 208 may be cleaned, transformed, and reduced with respect to raw usage logs into a machine usable form.

At 214, with respect to session level filtering and random sampling, the sessions 128 may be filtered to identify sessions that include greater than or equal to a minimum number of tracks played. The identified sessions may be randomly sampled for generation of the embeddings as disclosed herein.

At 216, with respect to representation learning, a representation learning analyzer 218 that is executed by at least one hardware processor (e.g., the hardware processor 2102 of FIG. 21, and/or the hardware processor 2304 of FIG. 23) may determine track representations based on sampled session data with respect to the identified sessions from block 214, without support of track metadata. The track representations, which may be denoted as the embeddings 108, may be defined using, for example, word2vec. In this regard, tracks that are played, for example, in a session, may be considered as a sequence to generate a vector for each track. Each track may include a track identification that may include, for example, approximately two-hundred unique numbers (or a larger set of unique numbers). The track representation may represent a word2vec conversion of the track identification, and may include, for the track including, for example, approximately two-hundred unique numbers, approximately one-hundred unique numbers due to the word2vec conversion. Thus, the track representation may be defined by a vector of several dimensions defined by the unique numbers determined by the word2vec conversion. Two vectors may be similar to each other based on distances of the elements thereof. In a similar manner, two tracks having similar track representations may be similar to each other with respect to theme. The track representation may represent an intermediate representation that is learned, for example, by a neural network component of the representation learning analyzer 218, based on user behavior learned through the sessions 128 in order to understand how tracks may be related. For example, when tracks are played in a similar context in a session, the neural network component of the representation learning analyzer 218 may determine such tracks to be similar to each other. In this manner, the representation learning analyzer 218 may learn representations associated with each of the tracks.

Figure 2B:
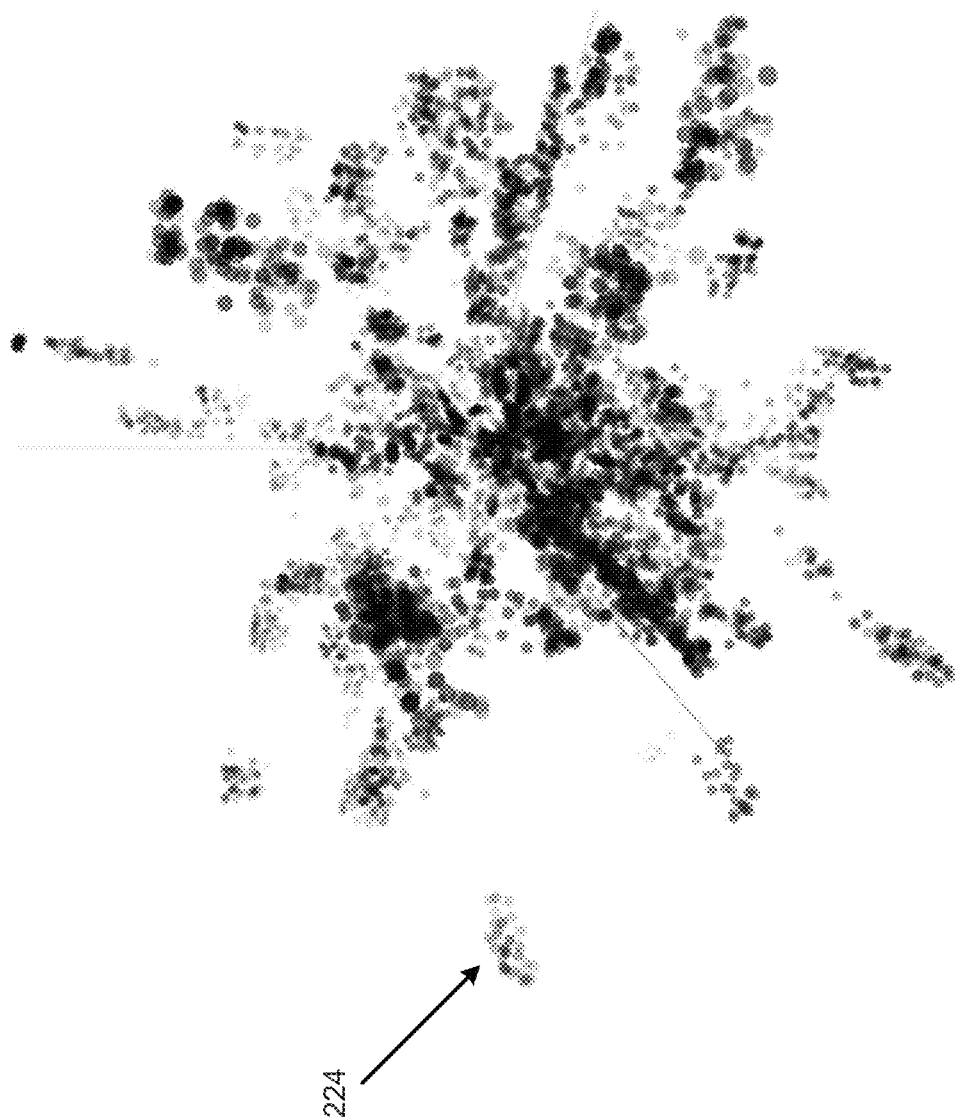
FIG. 2B illustrates a plot of embeddings to illustrate operation of the artificial intelligence based music playlist curation apparatus of FIG. 1 in accordance with an example of the present disclosure.

Referring to FIG. 2B, the representation learning analyzer 218 may also generate a plot of the embeddings in space based on a distance (e.g., cosine distance) between each unique embedding to facilitate a visual understanding of how each embedding (and thus track) may be related to each other. In FIG. 2B, each "dot" may represent a unique embedding. Further, each cluster, for example, at 224, may represent similar embeddings.

At 220, track representations, which may be denoted as the embeddings 108 as disclosed herein, may be stored and visualized, for example, by a display and/or playback device at 222, such as a smart phone, a tablet, a smartwatch, a computer, etc. In this regard, the embeddings may be utilized for determining overall track relatedness. For example, as disclosed herein, two vectors may be similar to each other based on distances of the elements thereof. In a similar manner, two tracks having similar track representations may be similar (e.g., related) to each other with respect to theme. Further, at 222, the output playlist 118 and/or clusters 124 (or a modified playlist as an output of the apparatus 100) may be generated, for example, for display and/or playback by a device, such as a smart phone, a tablet, a smartwatch, a computer, etc.

Figure 3:
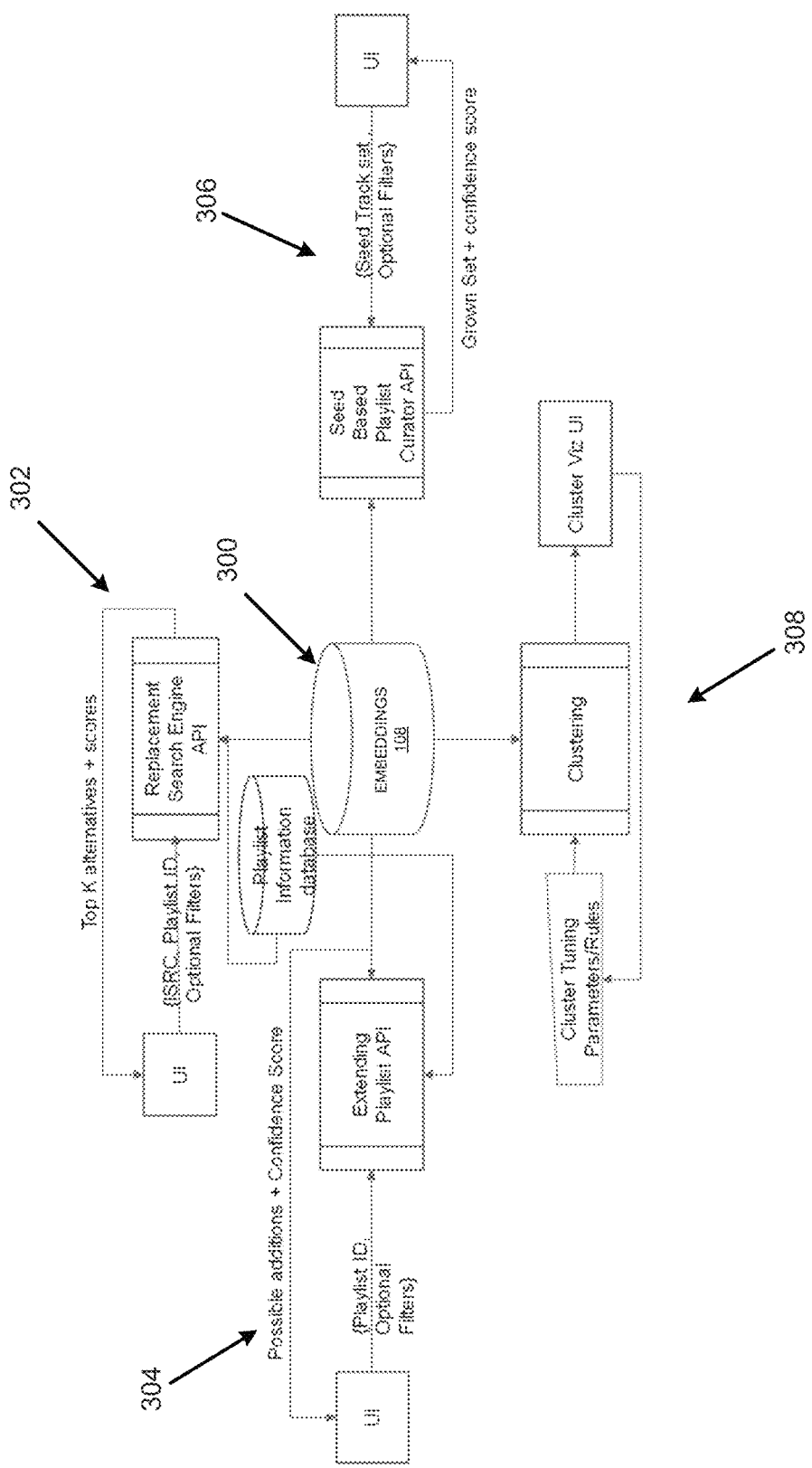
FIG. 3 illustrates further details of the architecture of the artificial intelligence based music playlist curation apparatus of FIG. 1 in accordance with an example of the present disclosure.

FIG. 3 illustrates further details of the architecture of the apparatus 100 in accordance with an example of the present disclosure.

Referring to FIG. 3, with respect to the embeddings 108 at 300, at 302, the playlist curator 110 may generate, based on the plurality of embeddings 108, a replacement track 112 for the existing track 114 in the input playlist 116.

At 304, the playlist curator 110 may add, based on the plurality of embeddings 108, at least one additional track to the input playlist 116. In this regard, a confidence score may be determined with respect to the at least one additional track.

At 306, the playlist curator 110 may generate, based on the plurality of embeddings 108 and based on a seed set of tracks 120, the output playlist 118 that includes a specified number of tracks that is greater than a number of tracks in the seed set of tracks 120. In this regard, a confidence score may be determined with respect to the additional tracks generated from the seed set of tracks 120

At 308, the playlist curator 110 may partition, based on a plurality of specified attributes 122, the plurality of embeddings 108 into a plurality of clusters 124 corresponding to the plurality of specified attributes 122.

Figure 4:
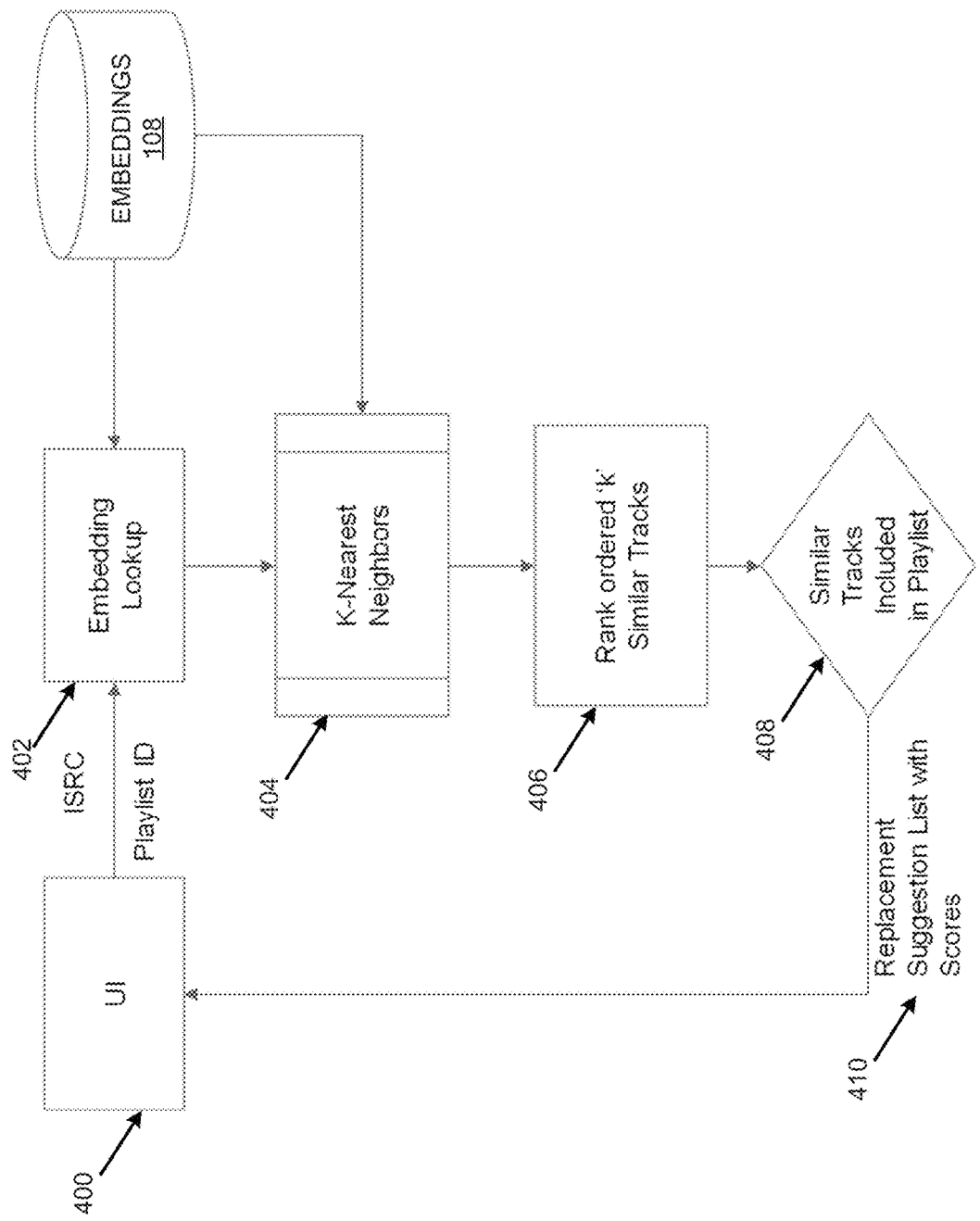
FIG. 4 illustrates a logical flow associated with replacement of an existing track to illustrate operation of the artificial intelligence based music playlist curation apparatus of FIG. 1 in accordance with an example of the present disclosure.

FIG. 4 illustrates a logical flow associated with replacement of an existing track to illustrate operation of the apparatus 100 in accordance with an example of the present disclosure.

Referring to FIG. 4, as disclosed herein, the playlist curator 110 may generate, based on the plurality of embeddings 108, the replacement track 112 (e.g., track XYZ123456) for the existing track 114 (e.g., track ABC123456) in the input playlist 116 that includes a plurality of tracks (e.g., track ABC123456, track ABC778779, etc.).

At 400, the playlist curator 110 may obtain the input playlist 116, for example, from a user interface. Further, the playlist curator 110 may generate, based on the plurality of embeddings 108, the replacement track 112 for the existing track 114 in the input playlist 116 by obtaining a track identification for the existing track 114 that is to be replaced. For example, the track identification may be denoted ABCD12341212 that is to be replaced.

At 402, the playlist curator 110 may identify, from the plurality of embeddings 108 and based on the track identification, an embedding associated with the existing track 114.

At 404, the playlist curator 110 may identify, from the plurality of embeddings 108, K-nearest neighbor embeddings relative to the identified embedding associated with the existing track.

With respect to K-nearest neighbors, the playlist curator 110 may obtain the identified embedding associated with the existing track, and determine the K-nearest neighbor embeddings. In this regard, the playlist curator 110 may query K-nearest neighbor embeddings. According to another example, if two or more (e.g., N) tracks in a playlist are to be replaced, the playlist curator 110 may independently query K-nearest neighbor embeddings for embeddings associated with each of the tracks that is to be replaced. In this regard, the playlist curator may query N*k embeddings, under the assumption that there is some team underlying the playlist. Further, there may be a set of/unique tracks, where I<N*k in the N*k itemset (e.g., some tracks may appear as a nearest neighbor to multiple tracks in the playlist). A number of playlist tracks to which a candidate has appreciable similarity may be denoted as a support as described herein.

At 406, the playlist curator 110 may rank the identified K-nearest neighbor embeddings. For example, assuming that there are five K-nearest neighbor embeddings, these five embeddings may be ranked in order of closest embedding to farthest embedding.

At 408, the playlist curator 110 may identify, from the ranked K-nearest neighbor embeddings, a highest ranked K-nearest neighbor embedding that is not included in the input playlist 116. For example, assuming that the highest ranked K-nearest neighbor embedding is already included in the input playlist 116, the playlist curator 110 may thereafter determine whether a second-highest ranked K-nearest neighbor embedding is already included in the input playlist 116, and so forth.

At 410, the playlist curator 110 may designate the highest ranked K-nearest neighbor embedding as the replacement track for the existing track 114 in the input playlist 116. For example, assuming that the second-highest ranked K-nearest neighbor embedding is not included in the input playlist 116, the playlist curator 110 may designate the second-highest ranked K-nearest neighbor embedding as the replacement track for the existing track 114 in the input playlist 116.

Figure 5:
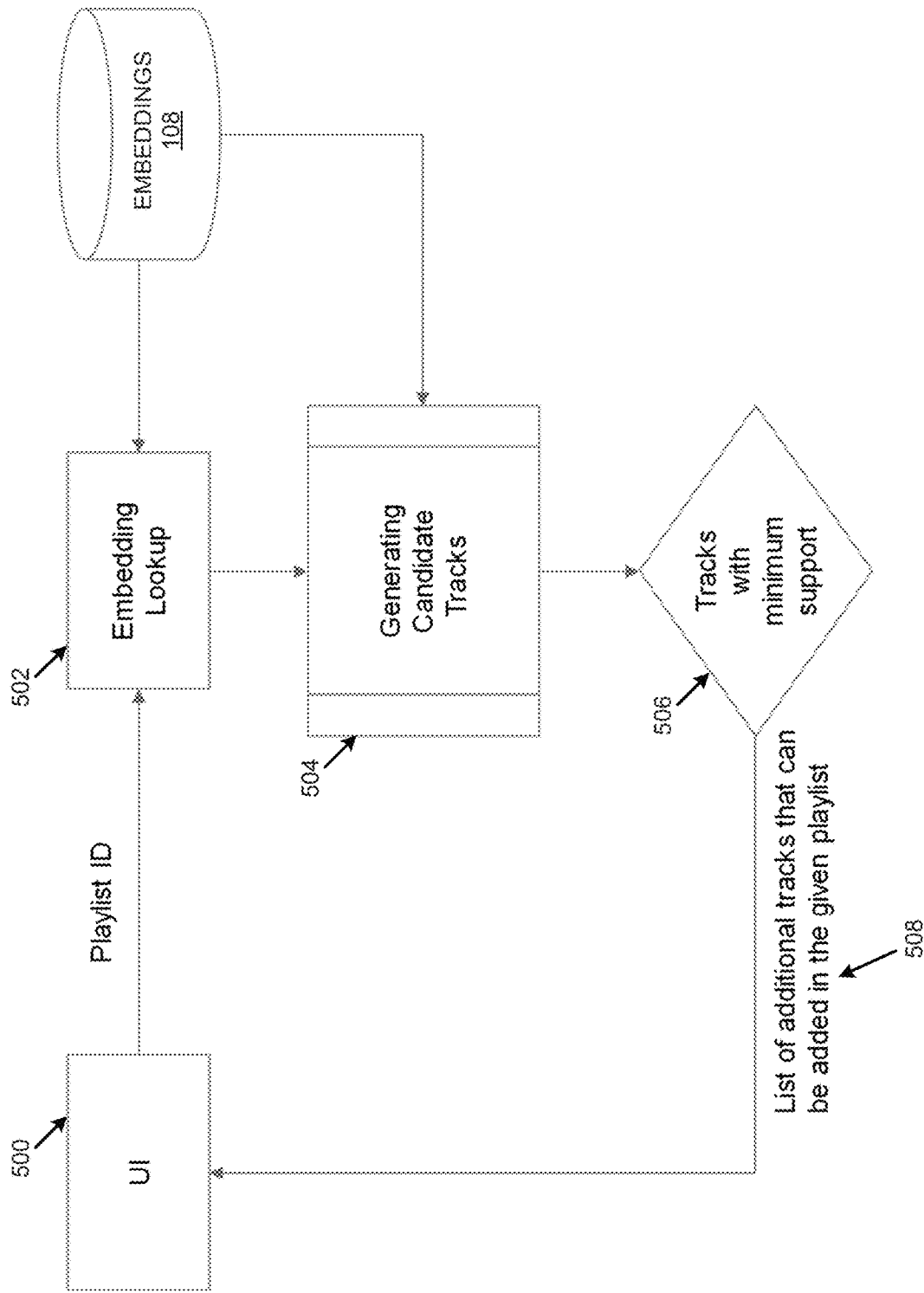
FIG. 5 illustrates a logical flow associated with extending an existing playlist to illustrate operation of the artificial intelligence based music playlist curation apparatus of FIG. 1 in accordance with an example of the present disclosure.

FIG. 5 illustrates a logical flow associated with extending an existing playlist to illustrate operation of the apparatus 100 in accordance with an example of the present disclosure.

Referring to FIG. 5, at 500, the playlist curator 110 may obtain the input playlist 116, for example, from a user interface.

At 502, the playlist curator 110 may identify, from the plurality of embeddings 108, embeddings associated with tracks included in the input playlist 116. For example, assuming that the input playlist 116 includes ten tracks, in this regard, the playlist curator 110 may identify the corresponding ten embeddings from the plurality of embeddings 108.

At 504, the playlist curator 110 may identify, based on cosine similarity between the embeddings associated with the tracks included in the input playlist 116 and the plurality of embeddings 108, the at least one additional track. In this regard, if a plurality of candidate tracks is to be generated, the playlist curator 110 may identify, based on cosine similarity between the embeddings associated with the tracks included in the input playlist 116 and the plurality of embeddings 108, at least two additional tracks. For example, the playlist curator 110 may generate twelve additional tracks.

At 506, the playlist curator 110 may determine, for each track of the at least two additional tracks, a support factor that specifies a number of times a track of the at least two additional tracks is similar to a track of the input playlist 116. Further, details with respect to the support factor are described herein with reference to FIG. 8.

At 508, the playlist curator 110 may designate the track of the at least two additional tracks that includes a specified minimum support factor as the at least one additional track that is to be added to the input playlist 116.

Figure 6:
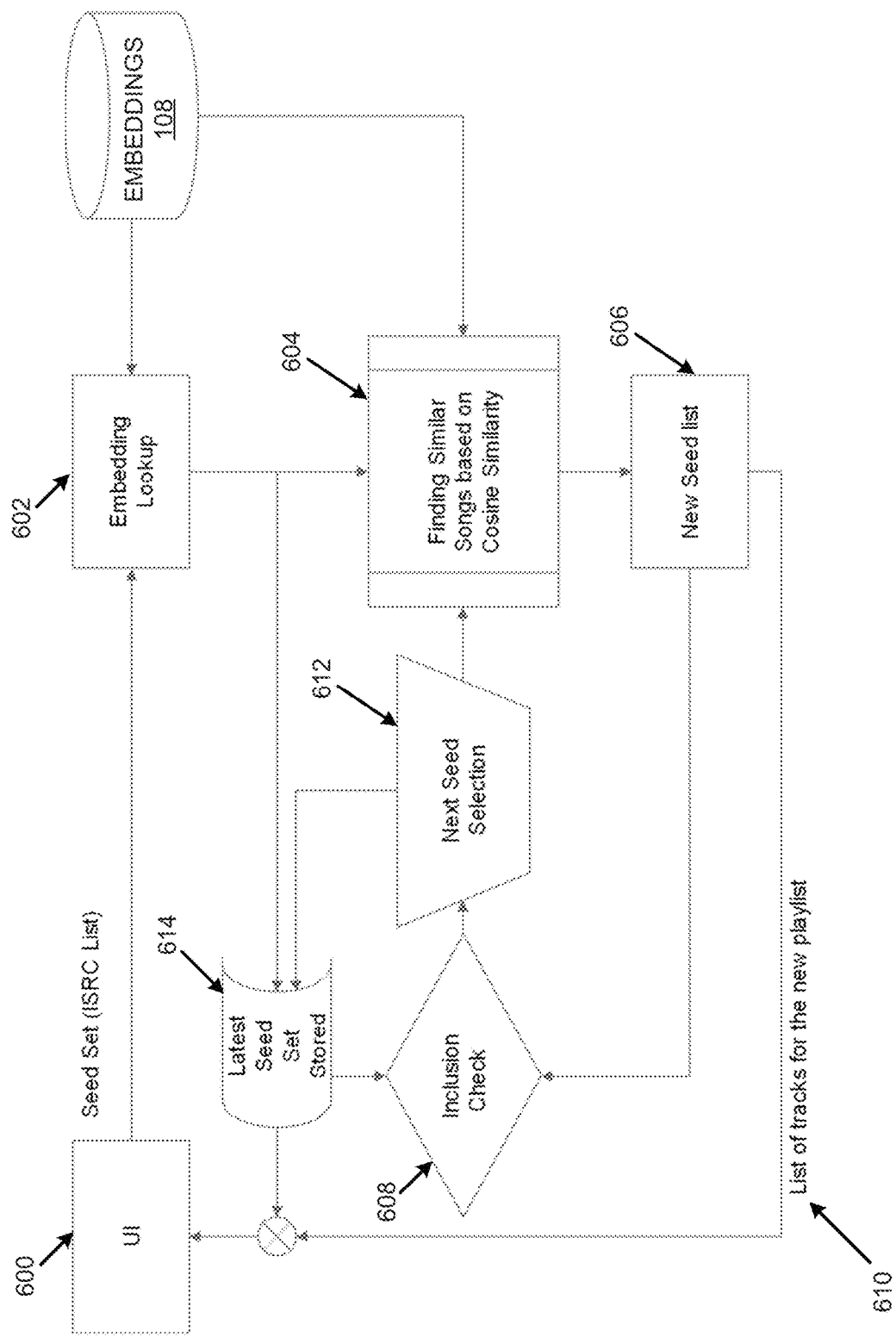
FIG. 6 illustrates a logical flow associated with generating a playlist based on a seed set of tracks to illustrate operation of the artificial intelligence based music playlist curation apparatus of FIG. 1 in accordance with an example of the present disclosure.

FIG. 6 illustrates a logical flow associated with generating a playlist based on a seed set of tracks to illustrate operation of the apparatus 100 in accordance with an example of the present disclosure.

With respect to seed based playlist generation, track representations may be used to create a theme based playlist as disclosed herein. Further, similar tracks of any given track may be used for suggesting additional tracks, and replacement for a track in a playlist. The playlist curator 110 may implement the seed based playlist generation by first selecting a few (e.g., 5-6) prominent tracks based on a theme (e.g., children's music, jazz, etc.). These tracks may be considered as seed tracks which may be used to select other tracks. Given the tracks in the seed set of tracks, the playlist curator 110 may implement cosine similarity to determine topmost similar tracks for each track. In some cases, the topmost similar tracks for the example of the five to six seed tracks may include a list of 40-45 tracks. These similar tracks may be validated, for example, using a human expert, or based on support factor analysis as disclosed herein with respect to FIG. 8. A subset from the validated similar tracks may include, for example, 25-30 tracks, which may be used as another seed set of tracks for another iteration to obtain similar tracks. The process for determining similar tracks may be repeated until a sufficient number of relevant tracks are determined with respect to a theme, or until a list includes a desire length of a playlist.

Referring to FIG. 6, at 600, the playlist curator 110 may obtain a seed set of tracks 120, for example, from a user interface. In this regard, the playlist curator 110 may generate, based on the plurality of embeddings 108 and based on the seed set of tracks 120, the output playlist 118 that includes a specified number of tracks that is greater than a number of tracks in the seed set of tracks 120.

For example, at 602, the playlist curator 110 may identify, from the plurality of embeddings 108 and based on the seed set of tracks 120, embeddings associated with the seed set of tracks 120. The seed set of tracks 120 may be designated an original seed set of tracks.

At 604, the playlist curator 110 may identify, based on cosine similarity between the embeddings associated with the seed set of tracks 120 (which are represented by embeddings) and the plurality of embeddings 108, a new seed set of tracks (e.g., at 606). A number of tracks included in the new seed set of tracks may be greater than a number of tracks included in the original seed set of tracks.

At 608, the playlist curator 110 may perform an inclusion check, for example, by determining and analyzing a support factor that specifies a number of times each track of the new seed set of tracks is similar to a track of the original seed set of tracks. Further, details with respect to the support factor are described herein with reference to FIG. 8.

At 610, the playlist curator 110 may generate, based on the new seed set of tracks, the output playlist 118.

Alternatively, at 612, the playlist curator 110 may perform another iteration based on the new seed set of tracks (e.g., from 606). In this regard, the playlist curator 110 may generate, based on the new seed set of tracks, the output playlist 118 by generating a further seed set of tracks by removing at least one track from the new seed set of tracks.

The further seed set of tracks may be stored at 614. At 604 again, the playlist curator 110 may identify, based on cosine similarity between the embeddings associated with the further seed set of tracks and the plurality of embeddings 108, a final seed set of tracks (e.g., again at 606). A number of tracks included in the final seed set of tracks may be greater than a number of tracks included in the original seed set of tracks.

At 610 again, the playlist curator 110 may generate, based on the final seed set of tracks, the output playlist 118.

If needed, further iterations may be performed in a similar manner as disclosed herein with respect to blocks 608, 612, and 614 to generate further seed of tracks, and thus further associated output playlists.

Figure 7:
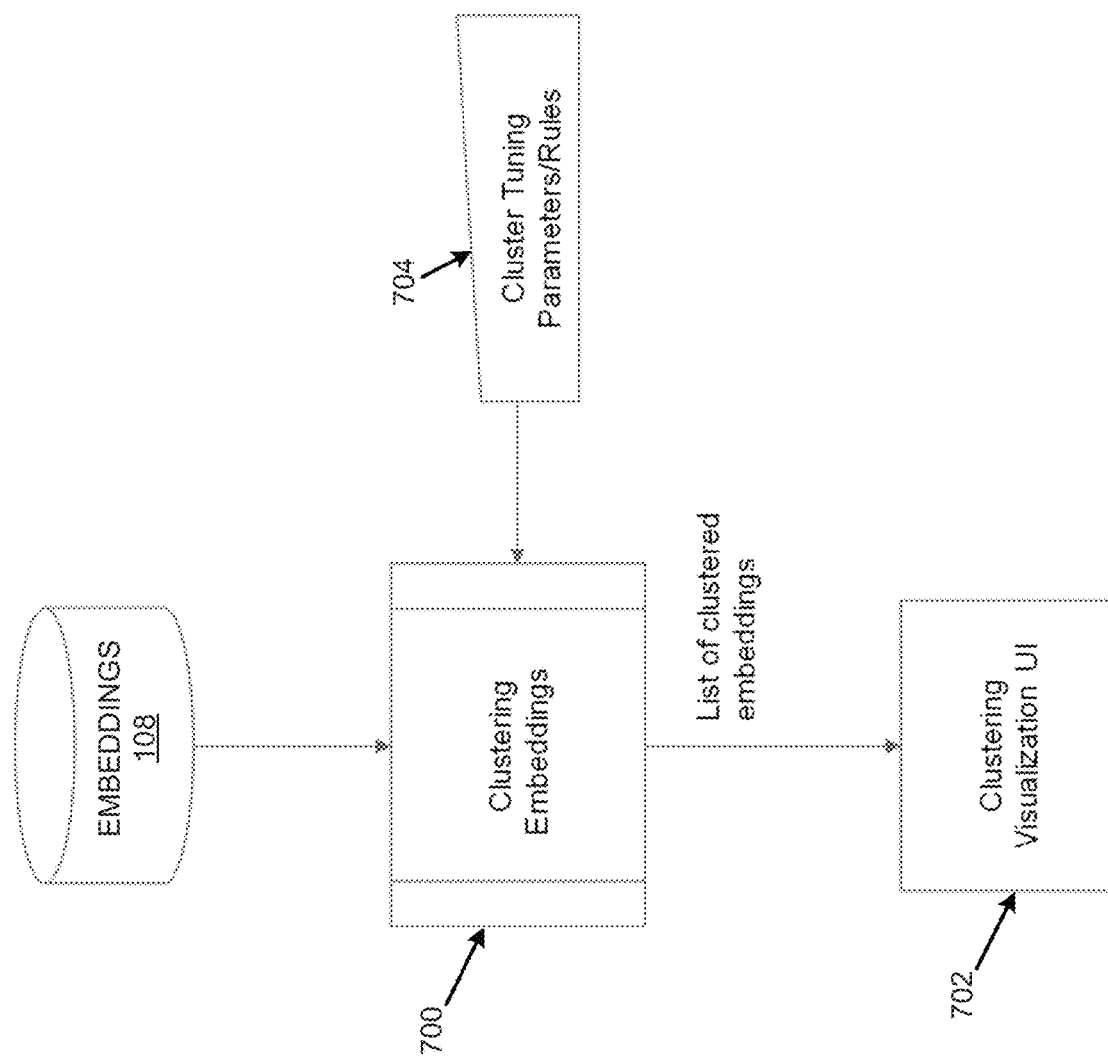
FIG. 7 illustrates a logical flow associated with partitioning of a plurality of embeddings into a plurality of clusters to illustrate operation of the artificial intelligence based music playlist curation apparatus of FIG. 1 in accordance with an example of the present disclosure.

FIG. 7 illustrates a logical flow associated with partitioning of a plurality of embeddings into a plurality of clusters to illustrate operation of the apparatus 100 in accordance with an example of the present disclosure.

Referring to FIG. 7, the playlist curator 110 may partition, based on a plurality of specified attributes 122, the plurality of embeddings 108 into a plurality of clusters 124 corresponding to the plurality of specified attributes 122.

For example, at 700, the playlist curator 110 may partition, based on a plurality of specified attributes 122, the plurality of embeddings 108 into the plurality of clusters 124 (e.g., output at 702) corresponding to the plurality of specified attributes 122 by identifying, based on K-means clustering and from the plurality of embeddings 108, the plurality of clusters 124 corresponding to the plurality of specified attributes 122.

At 704, examples of cluster tuning parameters may include, for example, a number of clusters, and rules may include, for example, a correct value of "K" for the K-means clustering.

Figure 8:
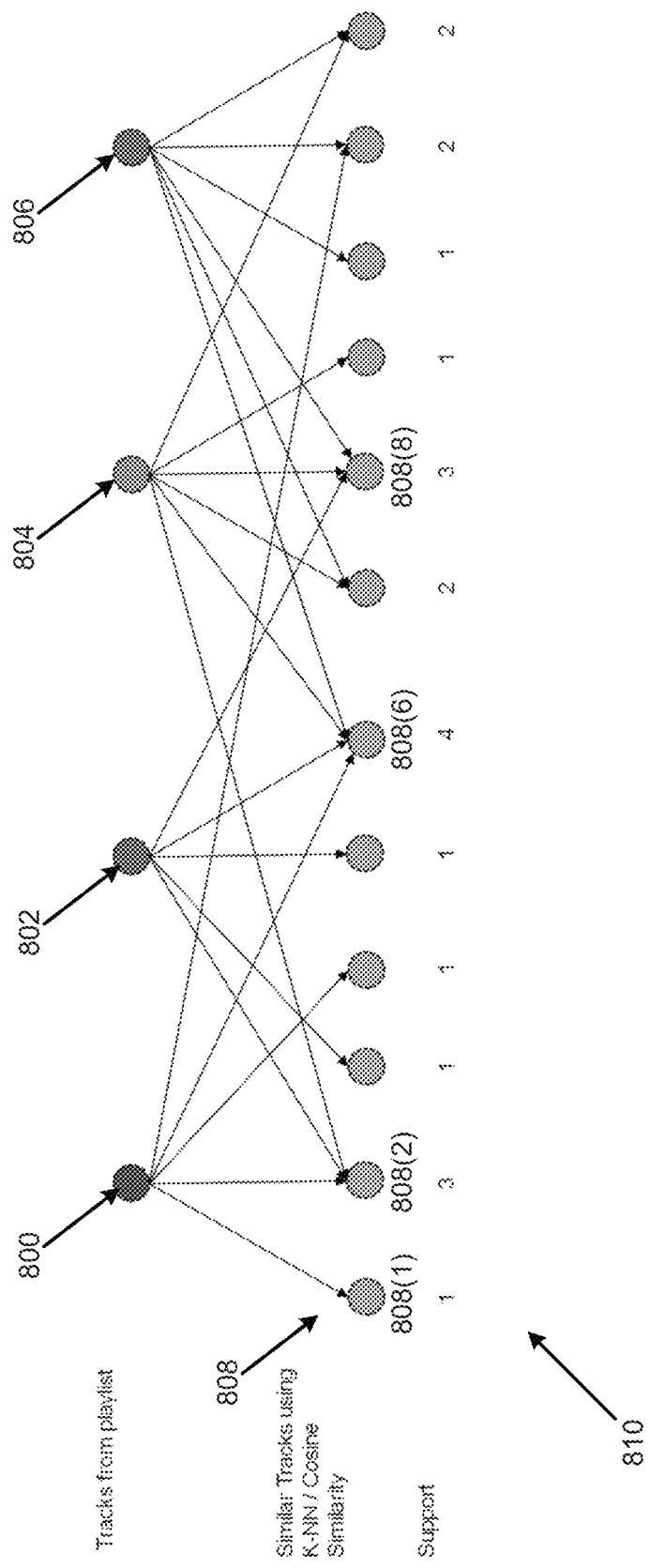
FIG. 8 illustrates an example of determination of a support factor to illustrate operation of the artificial intelligence based music playlist curation apparatus of FIG. 1 in accordance with an example of the present disclosure.

FIG. 8 illustrates an example of determination of a support factor to illustrate operation of the artificial intelligence based music playlist curation apparatus of FIG. 1 in accordance with an example of the present disclosure.

Referring to FIG. 8, as disclosed herein with respect to block 506 of FIG. 5, the playlist curator 110 may determine, for each track of the at least two additional tracks, a support factor that specifies a number of times a track of the at least two additional tracks is similar to a track of the input playlist 116. Similarly, as disclosed herein with respect to block 608 of FIG. 6, the playlist curator 110 may perform an inclusion check, for example, by determining and analyzing a support factor that specifies a number of times each track of the new seed set of tracks is similar to a track of the original seed set of tracks.

With respect to the support factor, assuming that for the tracks 800, 802, 804, and 806 (which may represent a track of the input playlist 116 or tracks of the original seed set of tracks), based on cosine similarity, resulting similar tracks are shown at 808, and the support factor for each of the resulting similar tracks is shown at 810. For example, for resulting similar track 808(1), the associated support factor is 1 (e.g., track 808(1) is similar to one of the tracks 800, 802, 804, and 806). For resulting similar track 808(2), the associated support factor is 3 (e.g., track 808(2) is similar to three of the tracks 800, 802, 804, and 806). In this manner, assuming that a minimum support factor threshold is set at three, similar tracks 808(2), 808(6), and 808(8) may be identified as tracks that meet or exceed the minimum support factor threshold.

FIGS. 9-19 illustrate an example of generation of an output playlist based on a seed set of tracks to illustrate operation of the apparatus 100 in accordance with an example of the present disclosure.

Figure 9:
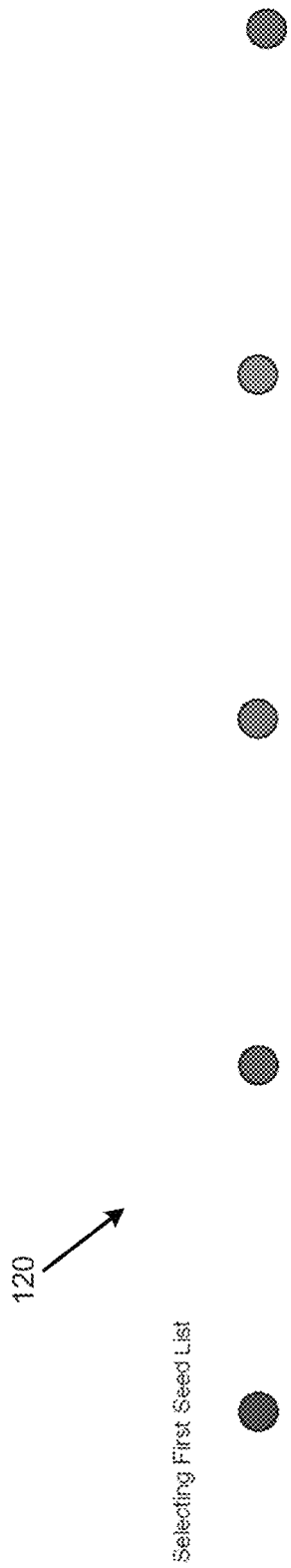
FIGS. 9-19 illustrate an example of generation of an output playlist based on a seed set of tracks to illustrate operation of the artificial intelligence based music playlist curation apparatus of FIG. 1 in accordance with an example of the present disclosure.

Referring to FIG. 9, with respect to block 600 of FIG. 6, the playlist curator 110 may obtain a seed set of tracks 120.

Figure 10:
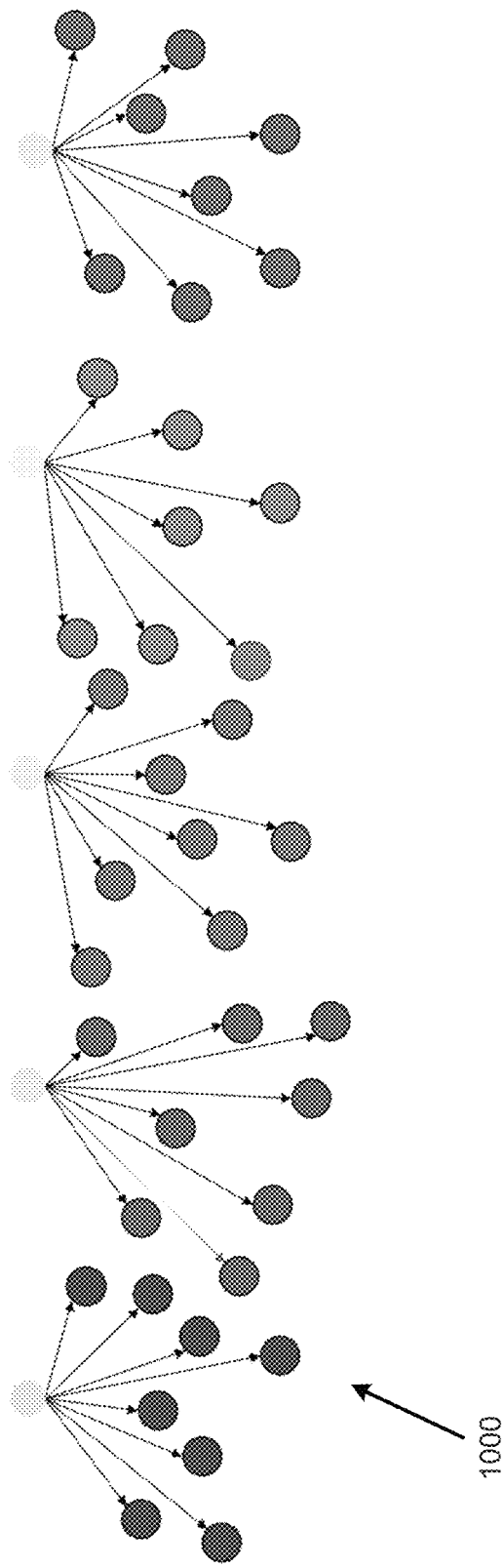

Referring to FIG. 10, as disclosed herein with respect to blocks 602 and 604 of FIG. 6, based on the seed set of tracks 120 of FIG. 9, the playlist curator 110 may identify, based on cosine similarity between the embeddings associated with the seed set of tracks 120 and the plurality of embeddings 108, a new seed set of tracks (e.g., at 1000).

Figure 11:
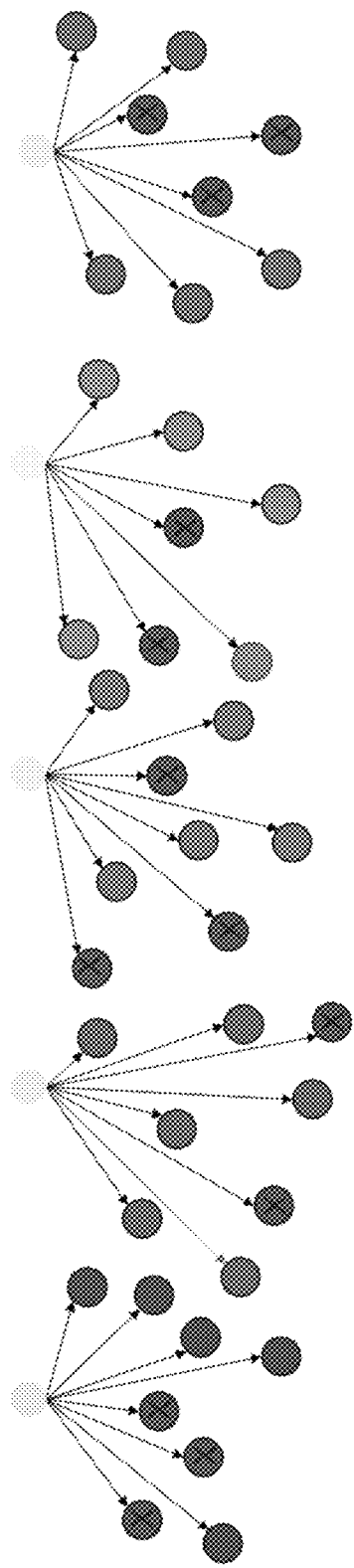

Referring to FIG. 11, as disclosed herein with respect to block 608 of FIG. 6, the playlist curator 110 may perform an inclusion check, for example, by determining and analyzing a support factor that specifies a number of times each track of the new seed set of tracks is similar to a track of the original seed set of tracks. In this regard, as disclosed herein with respect to FIG. 8, tracks that meet or exceed a minimum support factor threshold may be retained. For example, for FIG. 11, similar tracks that include an "X" may be discarded (e.g., where the discarded tracks do not meet the minimum support factor threshold), and the other similar tracks may be retained. Alternatively, instead of utilization of a support factor, a subject matter expert may decide which similar tracks to retain.

Figure 12:
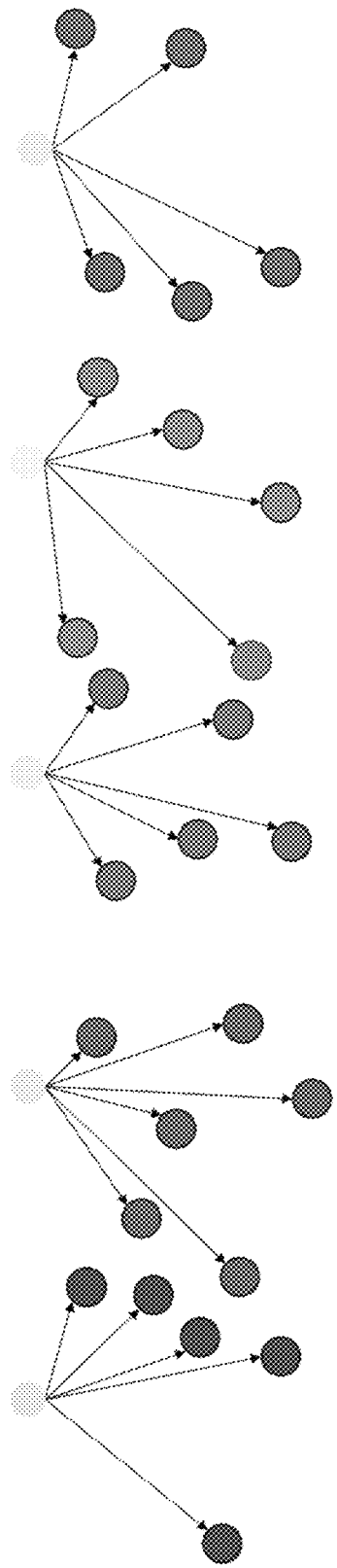

Referring to FIG. 12, the retained similar tracks from FIG. 11 are shown.

Figure 13:
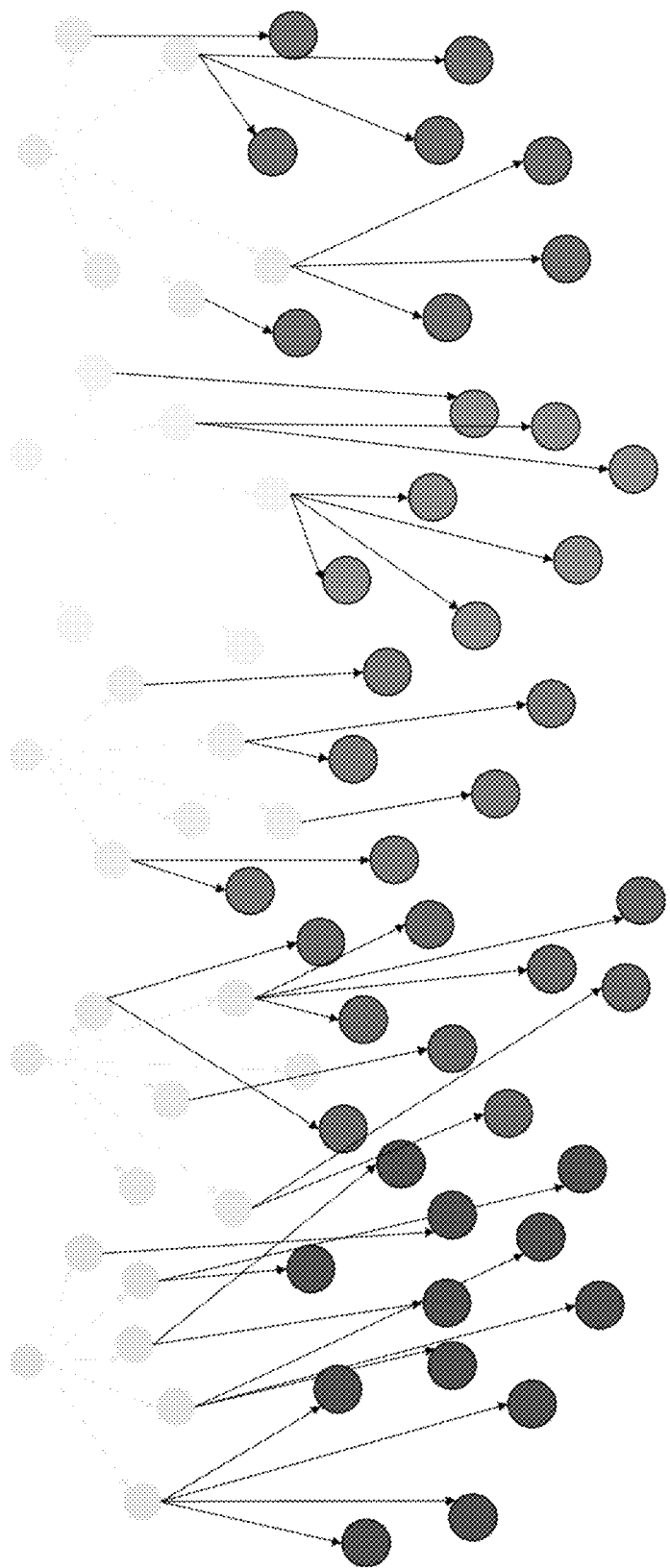

Referring to FIG. 13, the retained similar tracks from FIG. 11 may be used for further iterations to determine additional similar tracks as disclosed herein with respect to blocks 612 and 614.

Figure 14:
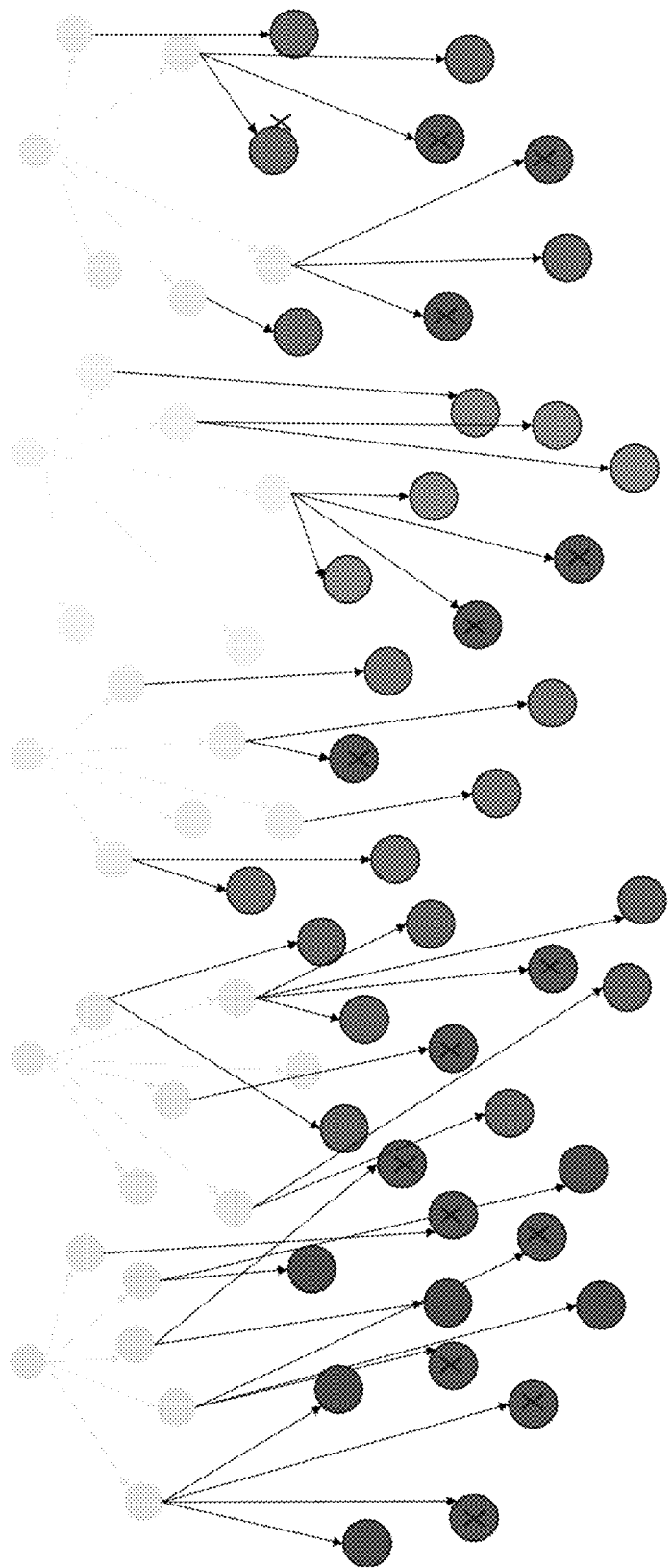

Referring to FIG. 14, in a similar manner as disclosed herein with respect to FIG. 11, similar tracks that include an "X" may be discarded, and the other similar tracks may be retained.

Figure 15:
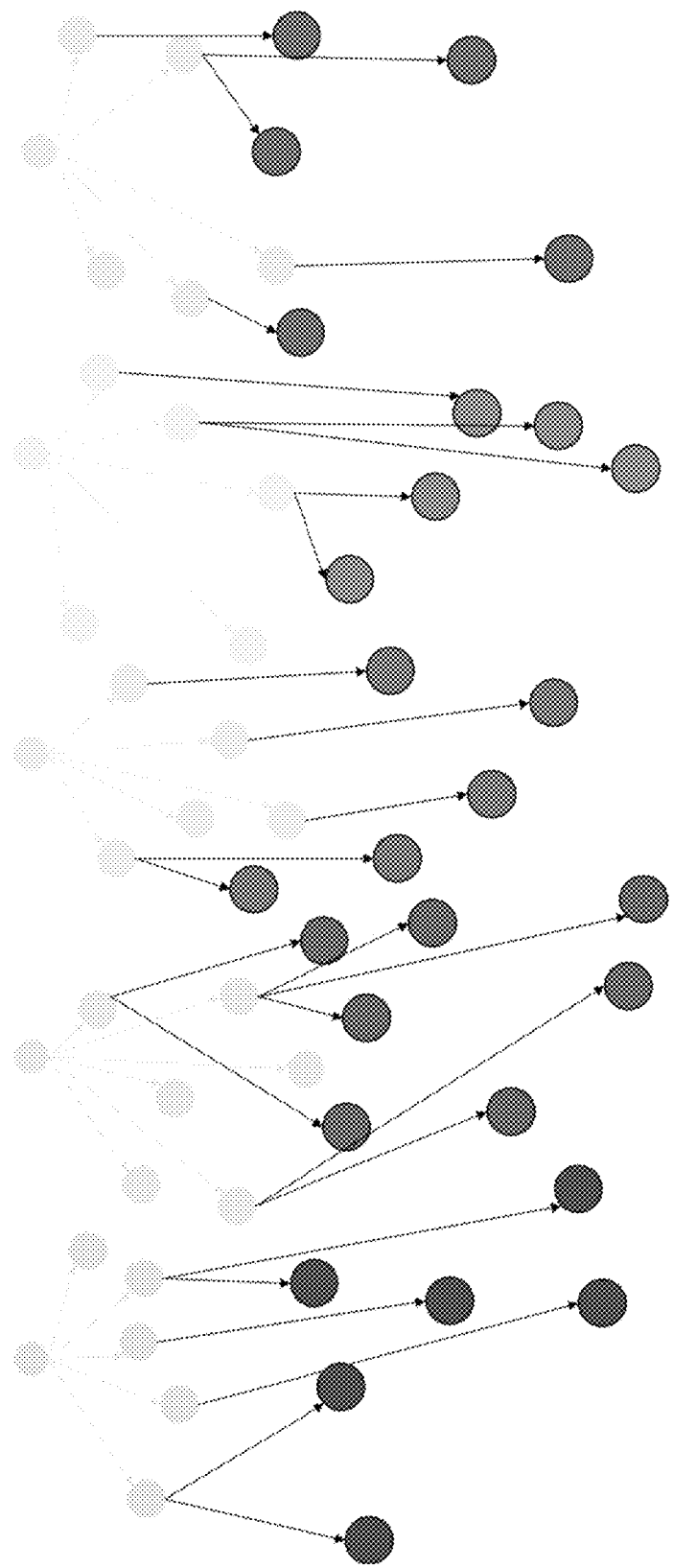

Referring to FIG. 15, in a similar manner as disclosed herein with respect to FIG. 12, the retained similar tracks from FIG. 14 are shown.

Figure 16:
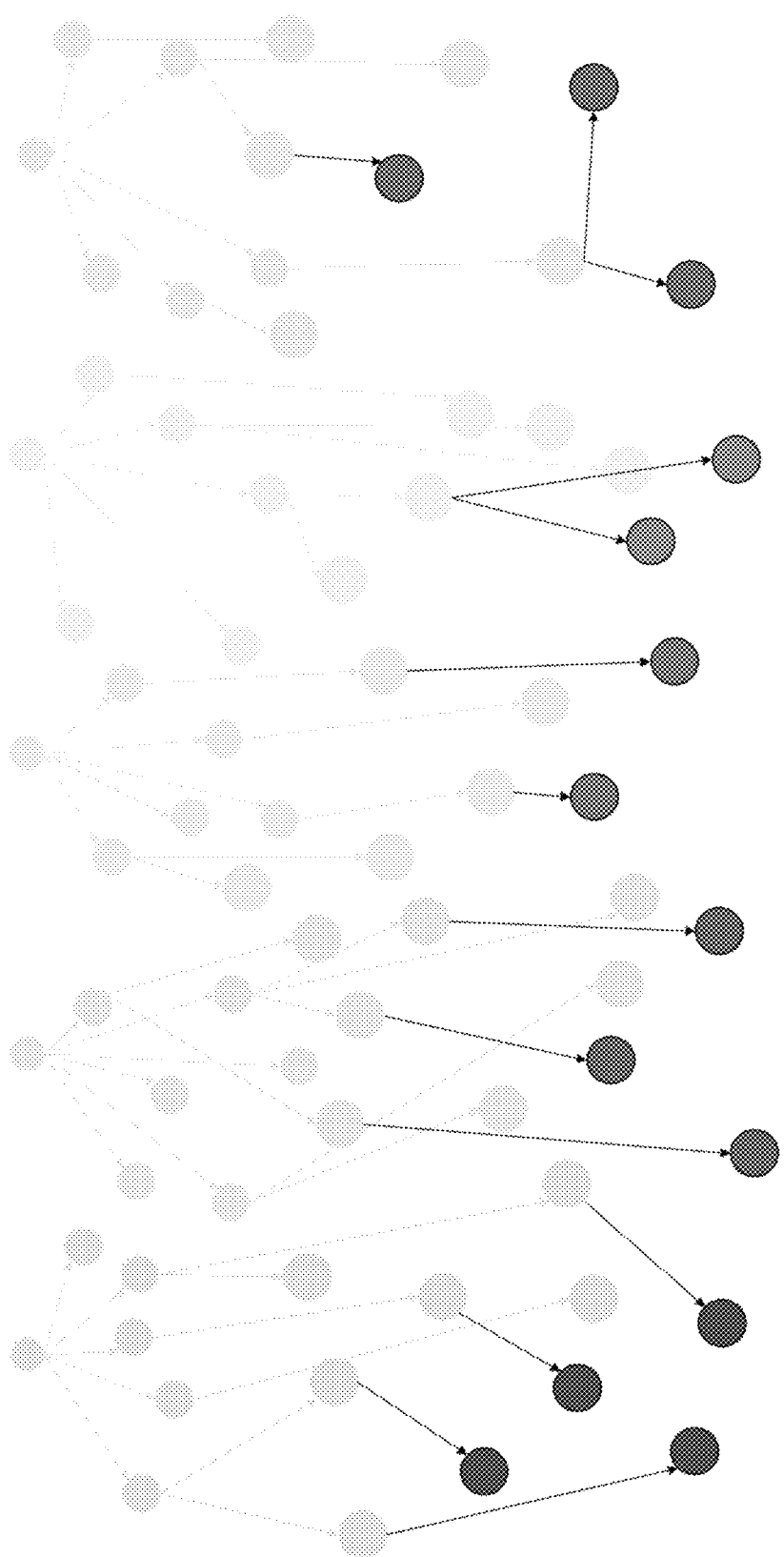

Referring to FIG. 16, the retained similar tracks from FIG. 15 may be used for further iterations to determine additional similar tracks as disclosed herein with respect to blocks 612 and 614.

Figure 17:
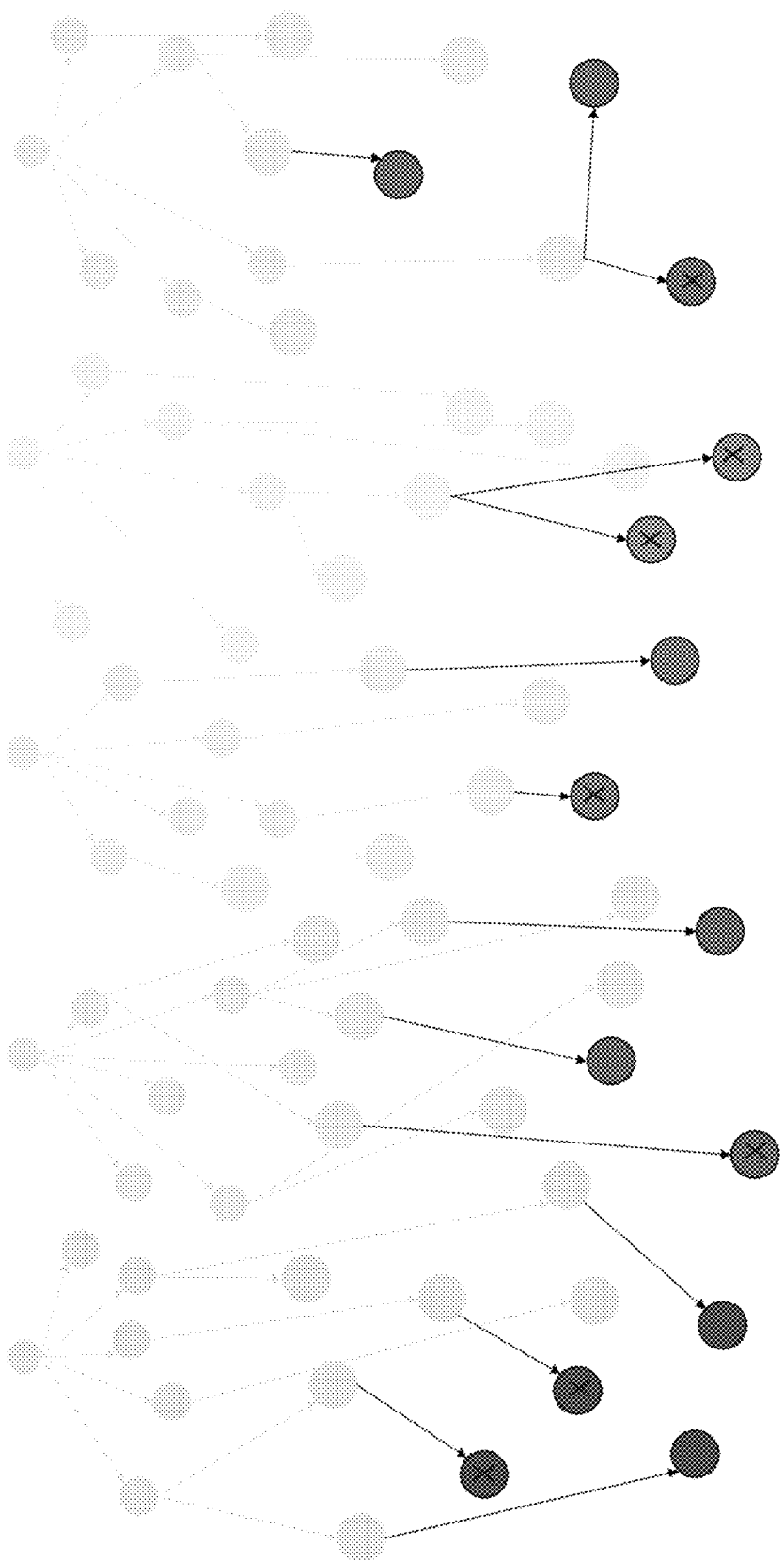

Referring to FIG. 17, in a similar manner as disclosed herein with respect to FIG. 11, similar tracks that include an "X" may be discarded, and the other similar tracks may be retained.

Figure 18:
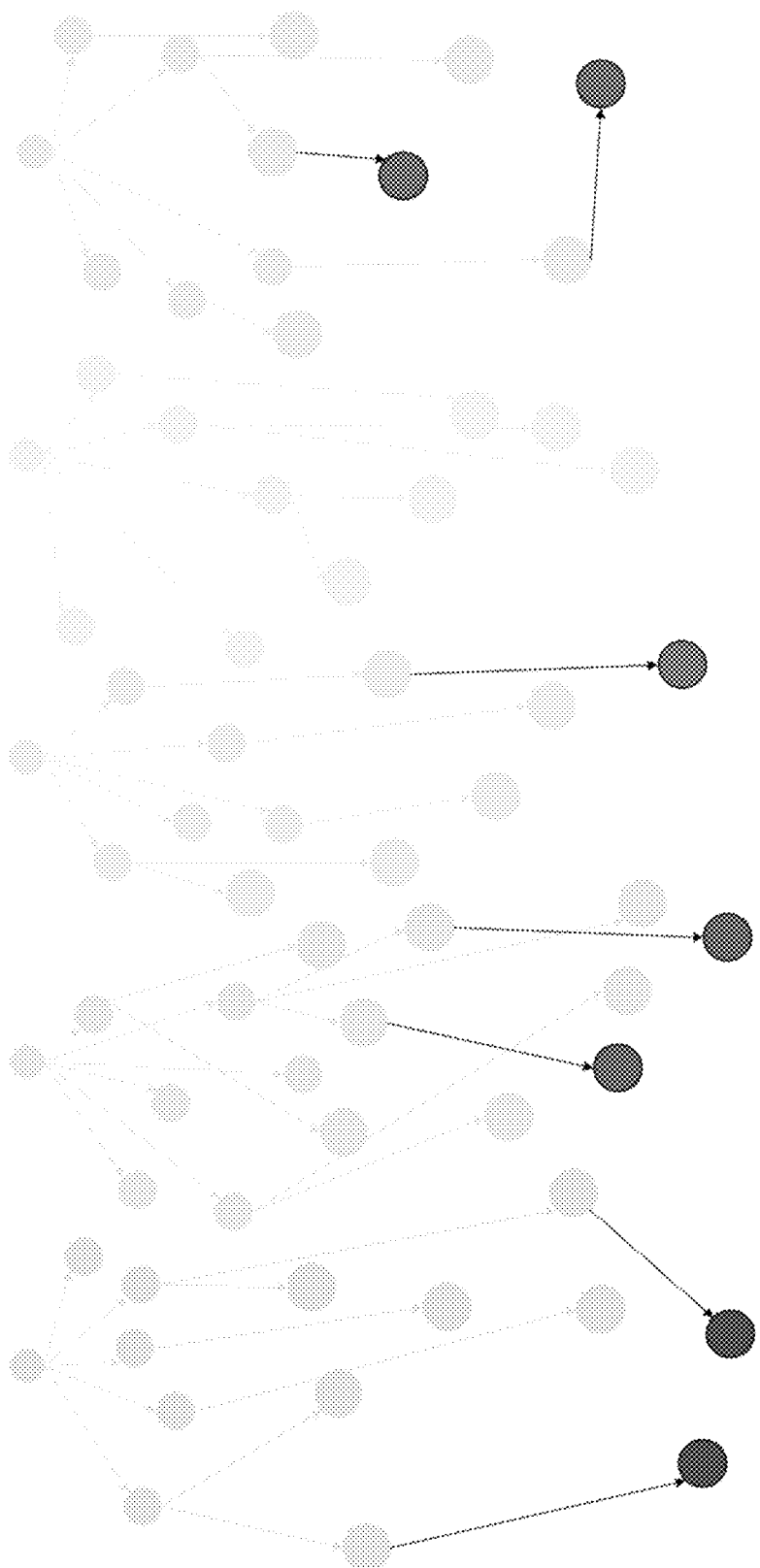

Referring to FIG. 18, in a similar manner as disclosed herein with respect to FIG. 12, the retained similar tracks from FIG. 17 are shown.

Figure 19:
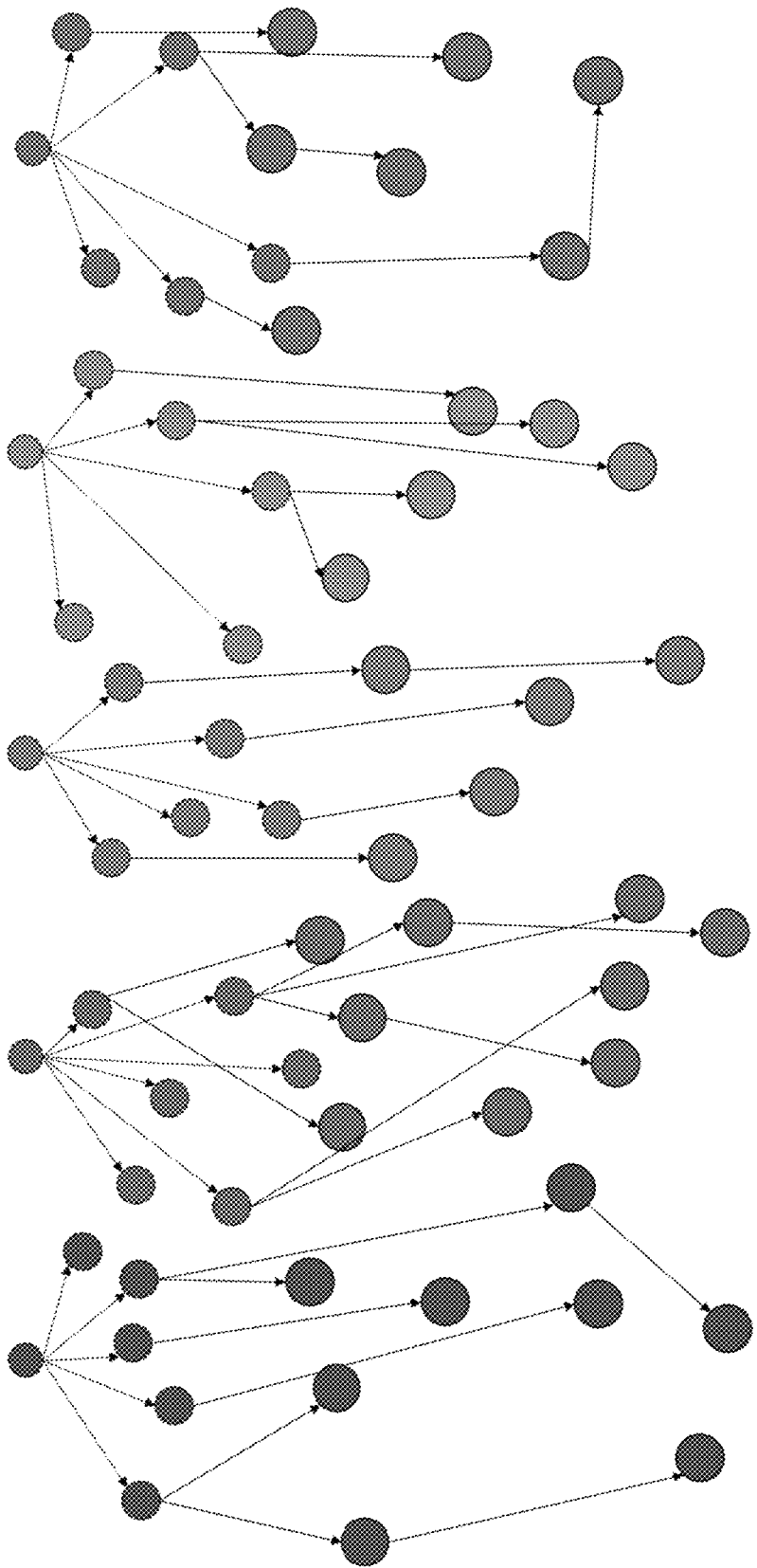

Referring to FIG. 19, the final output playlist 118 and associated tracks are shown. For example, the tracks of the final output playlist 118 may be ordered with respect to a highest number of played tracks to a lowest number of played tracks, randomly, or based on other techniques as disclosed herein.

FIG. 20 illustrates session generation to illustrate operation of the apparatus 100 in accordance with an example of the present disclosure.

Referring to FIG. 20, the session generator 126 may generate, based on an analysis of the listening data 104, the plurality of sessions 128. The session generator 126 may group the tracks 106 of the listening data 104 into sessions based on the utilization of heuristics. The session generator 126 may generate, based on the analysis of the listening data 104, the plurality of sessions 128 by determining, for each track played in the listening data 104, a user identification, a track identification, and a timestamp associated with playing of a track. For example, with respect to filtering of the listening data 104, the session generator 126 may select the "user_id", "track_id", and the "timestamp_utc" at which the track was played by the user.

The session generator 126 may generate groups from the listening data 104 according to the user identification and the timestamp. For example, the session generator 126 may group (e.g., utilizing a "groupby" technique) the data on the "user_id" and the "timestamp_utc" based on the count of unique tracks played.

The session generator 126 may filter the generated groups to determine groups that include a minimum count of unique tracks played. For example, the session generator 126 may filter the groups based on the count of user activity with a threshold on a minimum count of unique tracks played by the user. For example, the threshold may be specified as "5".

The session generator 126 may generate initial sessions by assigning session identifications to tracks of the determined groups that are played within a specified time difference threshold. For example, the session generator 126 may generate sessions 128 for each user based on the user's activity. A session may provide an indication of tracks that were played within a gap (e.g., threshold set) on the "timestamp_utc".

In order to generate the sessions 128, for every user, the session generator 126 may obtain a time difference between two consecutive listening tracks.

Based on a threshold set, for example, to 30 minutes on the time difference, the session generator 126 may assign session IDs (identifications) to each user activity. The tracks that are played within the specified time difference threshold may be assigned to the same session.

The session generator 126 may determine, from the generated initial sessions, the plurality of sessions 128 that include greater than or equal to a minimum number of tracks played. For example, the session generator 126 may filter out the sessions for each user based on the minimum number of tracks played in the session to determine the set of significant sessions corresponding to each other. In this regard, the threshold may be set, for example, to "4".

The session generator 126 may store a set of significant sessions that include the information related to tracks played by the users.

Referring to FIG. 20, the first five tracks with track ids abc123456, abc345678, abc567890, abc789012, and abc901234 may be assigned to a first session as they are played within a specified time difference threshold of 30 minutes. Thereafter, a new session may begin with track_id mno234567, as this track is played to include a time difference of 900 minutes (e.g., (54000 seconds)/(60 seconds/minute)).

Figure 21:
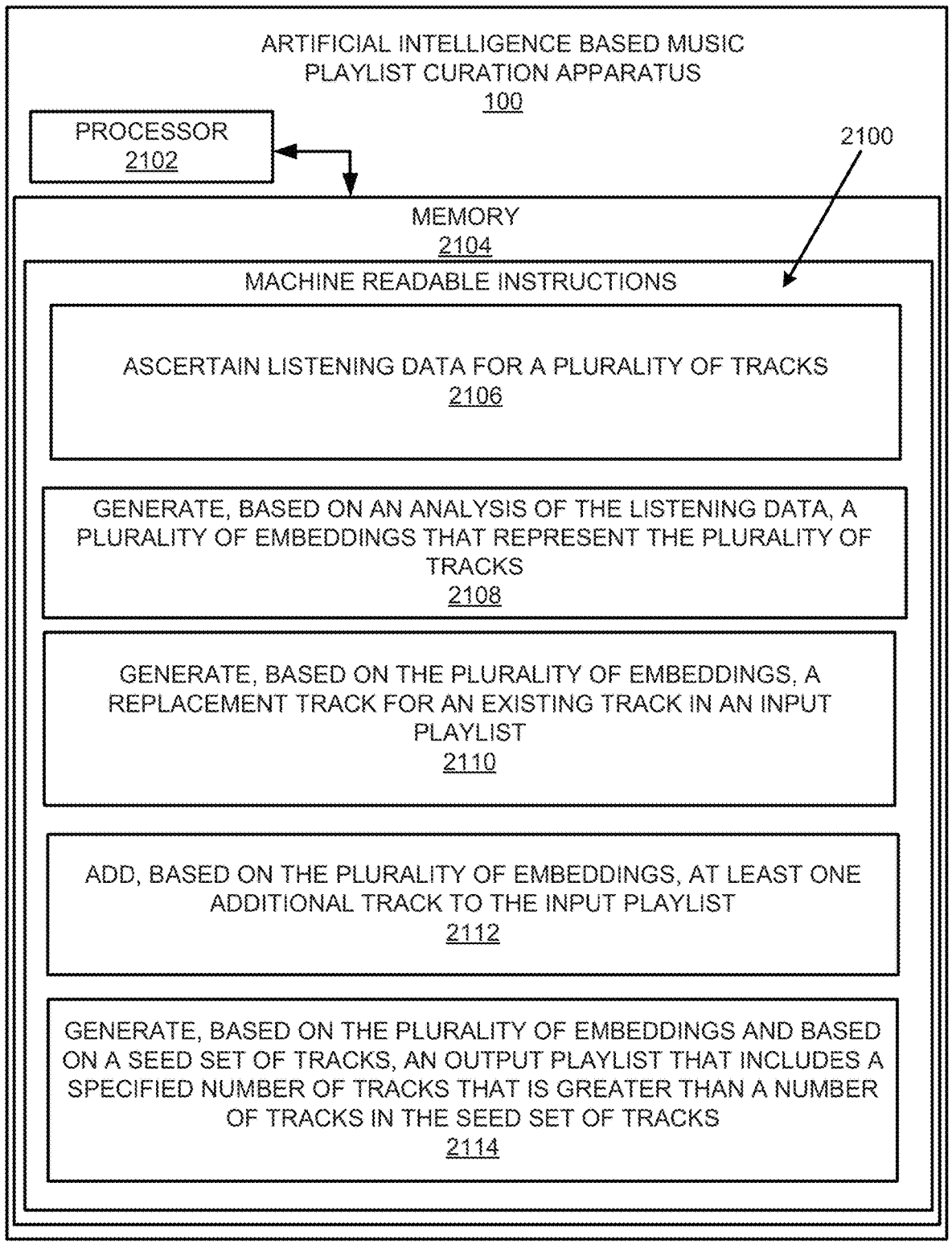
FIG. 21 illustrates an example block diagram for artificial intelligence based music playlist curation in accordance with an example of the present disclosure.
Figure 21:
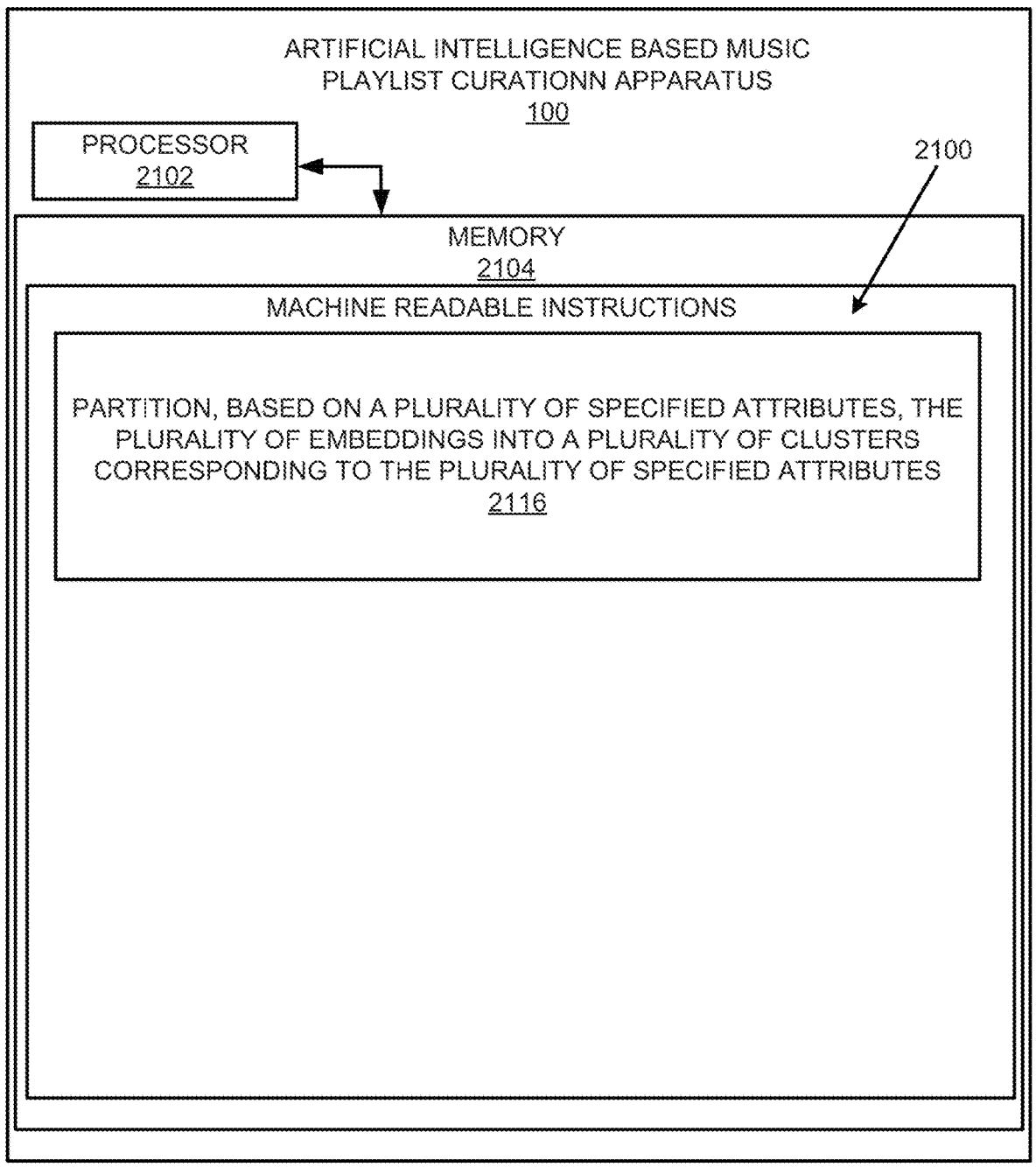
Figure 22:
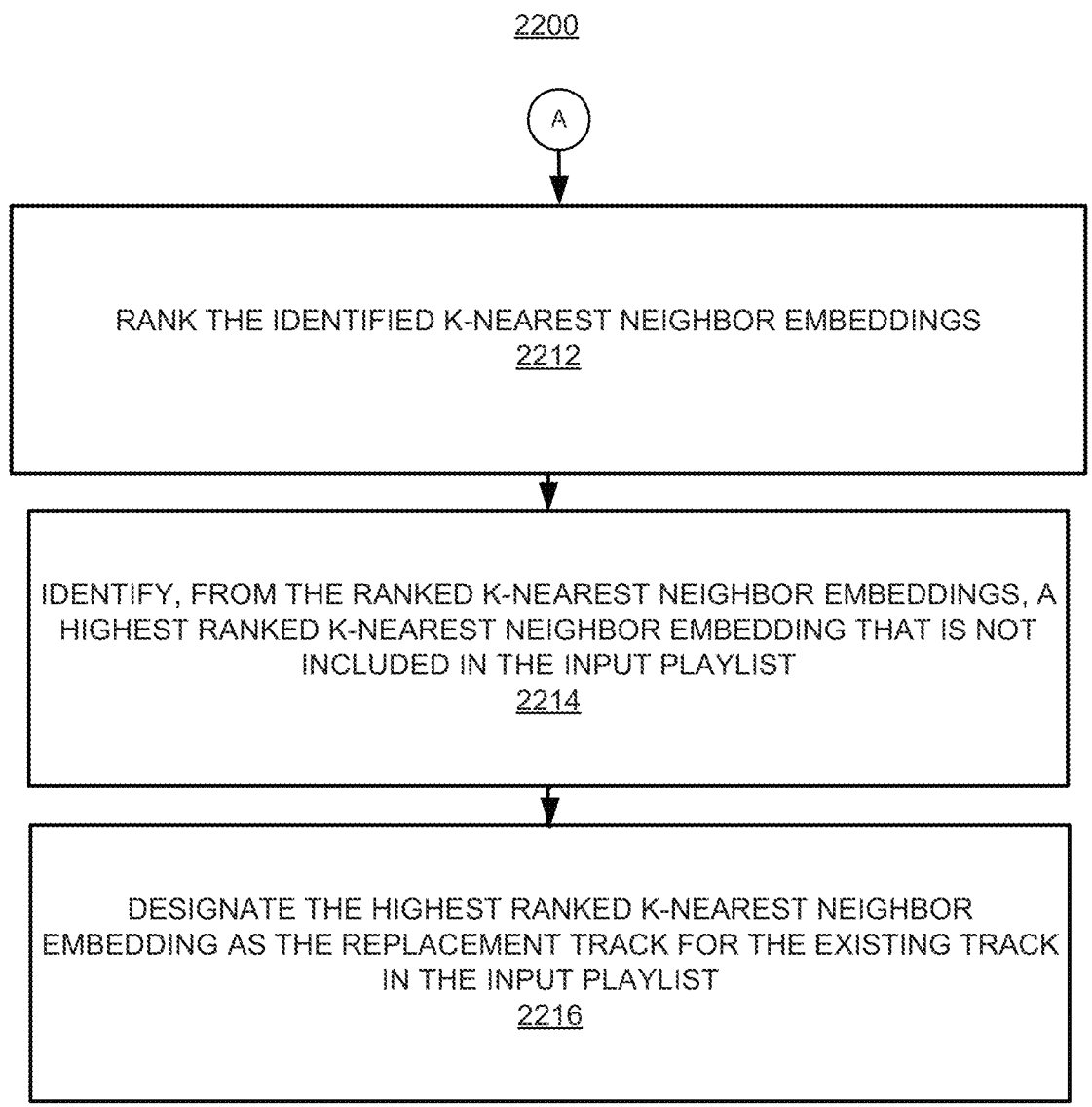
FIG. 22 illustrates a flowchart of an example method for artificial intelligence based music playlist curation in accordance with an example of the present disclosure.
Figure 23:
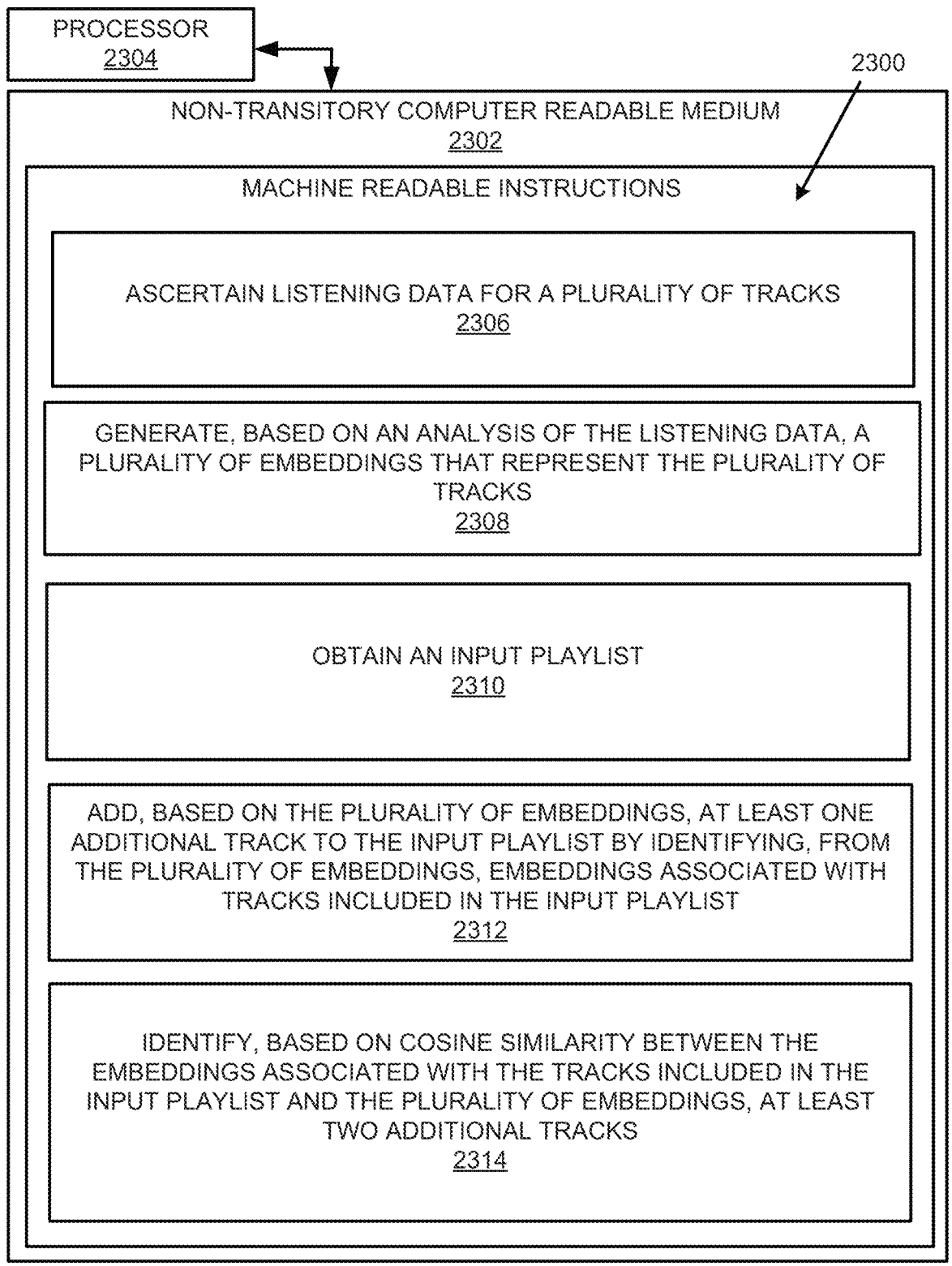
FIG. 23 illustrates a further example block diagram for artificial intelligence based music playlist curation in accordance with another example of the present disclosure.
Figure 23:
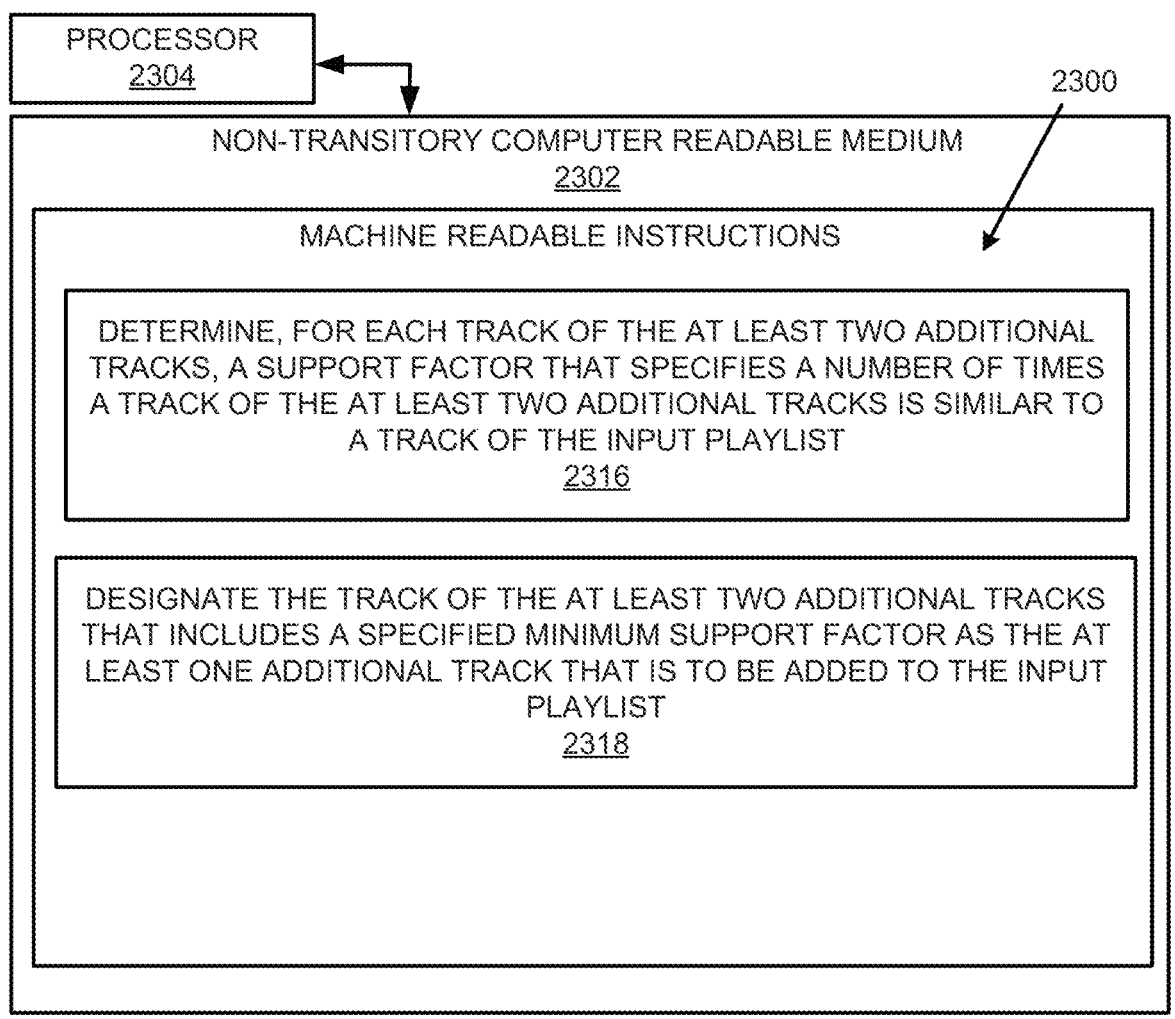

FIGS. 21-23 respectively illustrate an example block diagram 2100, a flowchart of an example method 2200, and a further example block diagram 2300 for artificial intelligence based music playlist curation, according to examples. The block diagram 2100, the method 2200, and the block diagram 2300 may be implemented on the apparatus 100 described above with reference to FIG. 1 by way of example and not of limitation. The block diagram 2100, the method 2200, and the block diagram 2300 may be practiced in other apparatus. In addition to showing the block diagram 2100, FIG. 21 shows hardware of the apparatus 100 that may execute the instructions of the block diagram 2100. The hardware may include a processor 2102, and a memory 2104 storing machine readable instructions that when executed by the processor cause the processor to perform the instructions of the block diagram 2100. The memory 2104 may represent a non-transitory computer readable medium. FIG. 22 may represent an example method for artificial intelligence based music playlist curation, and the steps of the method. FIG. 23 may represent a non-transitory computer readable medium 2302 having stored thereon machine readable instructions to provide artificial intelligence based music playlist curation according to an example. The machine readable instructions, when executed, cause a processor 2304 to perform the instructions of the block diagram 2300 also shown in FIG. 23.

The processor 2102 of FIG. 21 and/or the processor 2304 of FIG. 23 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 2302 of FIG. 23), such as hardware storage devices (e.g., RAM (random access memory), ROM (read only memory), EPROM (erasable, programmable ROM), EEPROM (electrically erasable, programmable ROM), hard drives, and flash memory). The memory 2104 may include a RAM, where the machine readable instructions and data for a processor may reside during runtime.

Referring to FIGS. 1-21, and particularly to the block diagram 2100 shown in FIG. 21, the memory 2104 may include instructions 2106 to ascertain listening data 104 for a plurality of tracks 106.

The processor 2102 may fetch, decode, and execute the instructions 2108 to generate, based on an analysis of the listening data 104, a plurality of embeddings 108 that represent the plurality of tracks 106.

The processor 2102 may fetch, decode, and execute the instructions 2110 to generate, based on the plurality of embeddings 108, a replacement track 112 for an existing track 114 in an input playlist 116.

The processor 2102 may fetch, decode, and execute the instructions 2112 to add, based on the plurality of embeddings 108, at least one additional track to the input playlist 116.

The processor 2102 may fetch, decode, and execute the instructions 2114 to generate, based on the plurality of embeddings 108 and based on a seed set of tracks 120, the output playlist 118 that includes a specified number of tracks that is greater than a number of tracks in the seed set of tracks 120.

The processor 2102 may fetch, decode, and execute the instructions 2116 to partition, based on a plurality of specified attributes 122, the plurality of embeddings 108 into a plurality of clusters 124 corresponding to the plurality of specified attributes 122.

Referring to FIGS. 1-20 and 22, and particularly FIG. 22, for the method 2200, at block 2202, the method may include ascertaining listening data 104 for a plurality of tracks 106.

At block 2204, the method may include generating, based on an analysis of the listening data 104, a plurality of embeddings 108 that represent the plurality of tracks 106.

At block 2206, the method may include generating, based on the plurality of embeddings 108, a replacement track 112 for an existing track 114 in an input playlist 116 by obtaining a track identification for the existing track 114 that is to be replaced.

At block 2208, the method may include identifying, from the plurality of embeddings 108 and based on the track identification, an embedding associated with the existing track 114.

At block 2210, the method may include identifying, from the plurality of embeddings 108, K-nearest neighbor embeddings relative to the identified embedding associated with the existing track.

At block 2212, the method may include ranking the identified K-nearest neighbor embeddings.

At block 2214, the method may include identifying, from the ranked K-nearest neighbor embeddings, a highest ranked K-nearest neighbor embedding that is not included in the input playlist 116.

At block 2216, the method may include designating the highest ranked K-nearest neighbor embedding as the replacement track for the existing track 114 in the input playlist 116.

Referring to FIGS. 1-20 and 23, and particularly FIG. 23, for the block diagram 2300, the non-transitory computer readable medium 2302 may include instructions 2306 to ascertain listening data 104 for a plurality of tracks 106.

The processor 2304 may fetch, decode, and execute the instructions 2308 to generate, based on an analysis of the listening data 104, a plurality of embeddings 108 that represent the plurality of tracks 106.

The processor 2304 may fetch, decode, and execute the instructions 2310 to obtain an input playlist 116.

The processor 2304 may fetch, decode, and execute the instructions 2312 to add, based on the plurality of embeddings 108, at least one additional track to the input playlist 116 by identifying, from the plurality of embeddings 108, embeddings associated with tracks included in the input playlist 116.

The processor 2304 may fetch, decode, and execute the instructions 2314 to identify, based on cosine similarity between the embeddings associated with the tracks included in the input playlist 116 and the plurality of embeddings 108, at least two additional tracks.

The processor 2304 may fetch, decode, and execute the instructions 2316 to determine, for each track of the at least two additional tracks, a support factor that specifies a number of times a track of the at least two additional tracks is similar to a track of the input playlist 116.

The processor 2304 may fetch, decode, and execute the instructions 2318 to designate the track of the at least two additional tracks that includes a specified minimum support factor as the at least one additional track that is to be added to the input playlist 116.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An artificial intelligence based music playlist curation apparatus comprising:
   at least one hardware processor;
   an embedding generator, executed by the at least one hardware processor, to
      ascertain listening data for a plurality of tracks, and
      generate, based on an analysis of the listening data, a plurality of embeddings that represent the plurality of tracks; and
   a playlist curator, executed by the at least one hardware processor,
      to at least one of
         generate, based on the plurality of embeddings, a replacement track for an existing track in an input playlist,
         add, based on the plurality of embeddings, at least one additional track to the input playlist, or
         partition, based on a plurality of specified attributes, the plurality of embeddings into a plurality of clusters corresponding to the plurality of specified attributes, and
      to generate, based on the plurality of embeddings and based on a seed set of tracks, an output playlist that includes a specified number of tracks that is greater than a number of tracks in the seed set of tracks by
         identifying, from the plurality of embeddings and based on the seed set of tracks, embeddings associated with the seed set of tracks, wherein the seed set of tracks is designated an original seed set of tracks, and
         identifying, based on cosine similarity between the embeddings associated with the seed set of tracks and the plurality of embeddings, a new seed set of tracks, wherein a number of tracks included in the new seed set of tracks is greater than a number of tracks included in the original seed set of tracks.

2. The apparatus according to claim 1, further comprising:
a session generator, executed by the at least one hardware processor, to generate, based on the analysis of the listening data, a plurality of sessions by:
determining, for each track played in the listening data, a user identification, a track identification, and a timestamp associated with playing of a track;
generating groups from the listening data according to the user identification and the timestamp;
filtering the generated groups to determine groups that include a minimum count of unique tracks played;
generating initial sessions by assigning session identifications to tracks of the determined groups that are played within a specified time difference threshold; and
determining, from the generated initial sessions, the plurality of sessions that include greater than or equal to a minimum number of tracks played.

3. The apparatus according to claim 1, wherein the playlist curator is executed by the at least one hardware processor to generate, based on the plurality of embeddings, the replacement track for the existing track in the input playlist by:
obtaining a track identification for the existing track that is to be replaced;
identifying, from the plurality of embeddings and based on the track identification, an embedding associated with the existing track;
identifying, from the plurality of embeddings, K-nearest neighbor embeddings relative to the identified embedding associated with the existing track;
ranking the identified K-nearest neighbor embeddings;
identifying, from the ranked K-nearest neighbor embeddings, a highest ranked K-nearest neighbor embedding that is not included in the input playlist; and
designating the highest ranked K-nearest neighbor embedding as the replacement track for the existing track in the input playlist.

4. The apparatus according to claim 1, wherein the playlist curator is executed by the at least one hardware processor to add, based on the plurality of embeddings, the at least one additional track to the input playlist by:
identifying, from the plurality of embeddings, embeddings associated with tracks included in the input playlist; and
identifying, based on cosine similarity between the embeddings associated with the tracks included in the input playlist and the plurality of embeddings, the at least one additional track.

5. The apparatus according to claim 1, wherein the playlist curator is executed by the at least one hardware processor to add, based on the plurality of embeddings, the at least one additional track to the input playlist by:
identifying, from the plurality of embeddings, embeddings associated with tracks included in the input playlist;
identifying, based on cosine similarity between the embeddings associated with the tracks included in the input playlist and the plurality of embeddings, at least two additional tracks;
determining, for each track of the at least two additional tracks, a support factor that specifies a number of times a track of the at least two additional tracks is similar to a track of the input playlist; and
designating the track of the at least two additional tracks that includes a specified minimum support factor as the at least one additional track that is to be added to the input playlist.

6. The apparatus according to claim 1, wherein the playlist curator is executed by the at least one hardware processor to generate, based on the plurality of embeddings and based on the seed set of tracks, the output playlist that includes the specified number of tracks that is greater than the number of tracks in the seed set of tracks by:
generating, based on the new seed set of tracks, the output playlist.

7. The apparatus according to claim 6, wherein the playlist curator is executed by the at least one hardware processor to generate, based on the new seed set of tracks, the output playlist by:
generating a further seed set of tracks by removing at least one track from the new seed set of tracks;
identifying, based on cosine similarity between the embeddings associated with the further seed set of tracks and the plurality of embeddings, a final seed set of tracks, wherein a number of tracks included in the final seed set of tracks is greater than a number of tracks included in the original seed set of tracks; and
generating, based on the final seed set of tracks, the output playlist.

8. The apparatus according to claim 1, wherein the playlist curator is executed by the at least one hardware processor to partition, based on the plurality of specified attributes, the plurality of embeddings into the plurality of clusters corresponding to the plurality of specified attributes by:
identifying, based on K-means clustering and from the plurality of embeddings, the plurality of clusters corresponding to the plurality of specified attributes.

9. The apparatus according to claim 8, wherein an attribute of the plurality of specified attributes includes a geographic region.

10. The apparatus according to claim 8, wherein an attribute of the plurality of specified attributes includes a type of person.

11. A method for artificial intelligence based music playlist curation, the method comprising:
ascertaining, by at least one hardware processor, listening data for a plurality of tracks;
generating, by the at least one hardware processor and based on an analysis of the listening data, a plurality of embeddings that represent the plurality of tracks;
generating, by the at least one hardware processor and based on the plurality of embeddings, a replacement track for an existing track in an input playlist by:
obtaining a track identification for the existing track that is to be replaced;
identifying, from the plurality of embeddings and based on the track identification, an embedding associated with the existing track;
identifying, from the plurality of embeddings, K-nearest neighbor embeddings relative to the identified embedding associated with the existing track;
ranking the identified K-nearest neighbor embeddings;
identifying, from the ranked K-nearest neighbor embeddings, a highest ranked K-nearest neighbor embedding that is not included in the input playlist; and
designating the highest ranked K-nearest neighbor embedding as the replacement track for the existing track in the input playlist; and generating, by the at least one hardware processor, based on the plurality of embeddings and based on a seed set of tracks, an output playlist that includes a specified number of tracks that is greater than a number of tracks in the seed set of tracks by:
identifying, from the plurality of embeddings and based on the seed set of tracks, embeddings associated with the seed set of tracks, wherein the seed set of tracks is designated an original seed set of tracks; and
identifying, based on cosine similarity between the embeddings associated with the seed set of tracks and the plurality of embeddings, a new seed set of tracks, wherein a number of tracks included in the new seed set of tracks is greater than a number of tracks included in the original seed set of tracks.

12. The method according to claim 11, further comprising:
adding, by the at least one hardware processor and based on the plurality of embeddings, at least one additional track to the input playlist by:
identifying, from the plurality of embeddings, embeddings associated with tracks included in the input playlist; and
identifying, based on cosine similarity between the embeddings associated with the tracks included in the input playlist and the plurality of embeddings, the at least one additional track.

13. The method according to claim 11, further comprising:
adding, by the at least one hardware processor and based on the plurality of embeddings, at least one additional track to the input playlist by:
identifying, from the plurality of embeddings, embeddings associated with tracks included in the input playlist;
identifying, based on cosine similarity between the embeddings associated with the tracks included in the input playlist and the plurality of embeddings, at least two additional tracks;
determining, for each track of the at least two additional tracks, a support factor that specifies a number of times a track of the at least two additional tracks is similar to a track of the input playlist; and
designating the track of the at least two additional tracks that includes a specified minimum support factor as the at least one additional track that is to be added to the input playlist.

14. The method according to claim 11, further comprising:
generating, based on the new seed set of tracks, the output playlist.

15. The method according to claim 14, wherein generating, by the at least one hardware processor and based on the new seed set of tracks, the output playlist, further comprises:
generating a further seed set of tracks by removing at least one track from the new seed set of tracks;
identifying, based on cosine similarity between the embeddings associated with the further seed set of tracks and the plurality of embeddings, a final seed set of tracks, wherein a number of tracks included in the final seed set of tracks is greater than a number of tracks included in the original seed set of tracks; and
generating, based on the final seed set of tracks, the output playlist.

16. The method according to claim 11, further comprising:
partitioning, by the at least one hardware processor and based on a plurality of specified attributes, the plurality of embeddings into a plurality of clusters corresponding to the plurality of specified attributes by:
identifying, based on K-means clustering and from the plurality of embeddings, the plurality of clusters corresponding to the plurality of specified attributes.

17. A non-transitory computer readable medium having stored thereon machine readable instructions, the machine readable instructions, when executed by at least one hardware processor, cause the at least one hardware processor to:
ascertain listening data for a plurality of tracks;
generate, based on an analysis of the listening data, a plurality of embeddings that represent the plurality of tracks;
obtain an input playlist; and
add, based on the plurality of embeddings, at least one additional track to the input playlist by:
identifying, from the plurality of embeddings, embeddings associated with tracks included in the input playlist;
identifying, based on cosine similarity between the embeddings associated with the tracks included in the input playlist and the plurality of embeddings, at least two additional tracks;
determining, for each track of the at least two additional tracks, a support factor that specifies a number of times a track of the at least two additional tracks is similar to a track of the input playlist; and
designating the track of the at least two additional tracks that includes a specified minimum support factor as the at least one additional track that is to be added to the input playlist.

18. The non-transitory computer readable medium according to claim 17, wherein the machine readable instructions, when executed by the at least one hardware processor, further cause the at least one hardware processor to:
generate, based on the plurality of embeddings, a replacement track for an existing track in the input playlist by:
obtaining a track identification for the existing track that is to be replaced;
identifying, from the plurality of embeddings and based on the track identification, an embedding associated with the existing track;
identifying, from the plurality of embeddings, K-nearest neighbor embeddings relative to the identified embedding associated with the existing track;
ranking the identified K-nearest neighbor embeddings;
identifying, from the ranked K-nearest neighbor embeddings, a highest ranked K-nearest neighbor embedding that is not included in the input playlist; and
designating the highest ranked K-nearest neighbor embedding as the replacement track for the existing track in the input playlist.

19. The non-transitory computer readable medium according to claim 17, wherein the machine readable instructions, when executed by the at least one hardware processor, further cause the at least one hardware processor to:
generate, based on the plurality of embeddings and based on a seed set of tracks, an output playlist that includes a specified number of tracks that is greater than a number of tracks in the seed set of tracks by:

identifying, from the plurality of embeddings and based on the seed set of tracks, embeddings associated with the seed set of tracks, wherein the seed set of tracks is designated an original seed set of tracks;

identifying, based on cosine similarity between the embeddings associated with the seed set of tracks and the plurality of embeddings, a new seed set of tracks, wherein a number of tracks included in the new seed set of tracks is greater than a number of tracks included in the original seed set of tracks; and generating, based on the new seed set of tracks, the output playlist.

20. The non-transitory computer readable medium according to claim 19, wherein the machine readable instructions to generate, based on the new seed set of tracks, the output playlist, when executed by the at least one hardware processor, further cause the at least one hardware processor to:

generate a further seed set of tracks by removing at least one track from the new seed set of tracks;

identify, based on cosine similarity between the embeddings associated with the further seed set of tracks and the plurality of embeddings, a final seed set of tracks, wherein a number of tracks included in the final seed set of tracks is greater than a number of tracks included in the original seed set of tracks; and generate, based on the final seed set of tracks, the output playlist.

* * * * *